(12) United States Patent
Nakade et al.

(10) Patent No.: US 11,388,431 B2
(45) Date of Patent: Jul. 12, 2022

(54) IMAGING APPARATUS AND IMAGING SYSTEM

(71) Applicant: Maxell, Ltd., Kyoto (JP)

(72) Inventors: Mayumi Nakade, Tokyo (JP); Yusuke Nakamura, Tokyo (JP); Keisuke Inata, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/981,703

(22) PCT Filed: Mar. 20, 2019

(86) PCT No.: PCT/JP2019/011771
§ 371 (c)(1),
(2) Date: Sep. 17, 2020

(87) PCT Pub. No.: WO2019/182029
PCT Pub. Date: Sep. 26, 2019

(65) Prior Publication Data
US 2021/0112266 A1     Apr. 15, 2021

(30) Foreign Application Priority Data

Mar. 23, 2018  (JP) .............................. JP2018-057043

(51) Int. Cl.
*H04N 19/46* (2014.01)
*H04N 19/60* (2014.01)
*H04N 5/217* (2011.01)

(52) U.S. Cl.
CPC ........... *H04N 19/46* (2014.11); *H04N 5/2173* (2013.01); *H04N 19/649* (2014.11)

(58) Field of Classification Search
CPC ..... H04N 19/46; H04N 19/649; H04N 5/2173
(Continued)

(56) References Cited

U.S. PATENT DOCUMENTS

| 5,878,168 A | 3/1999 | Kondo et al. |
| 2019/0339485 A1 | 11/2019 | Nakamura et al. |

FOREIGN PATENT DOCUMENTS

| JP | 09-055936 A | 2/1997 |
| JP | 2000-324482 A | 11/2000 |

(Continued)

OTHER PUBLICATIONS

International Search Report and Written Opinion dated May 14, 2019 for PCT/JP2019/011771 filed on Mar. 20, 2019, 13 pages including English Translation of the International Search Report.

(Continued)

*Primary Examiner* — On S Mung
(74) *Attorney, Agent, or Firm* — Xsensus LLP

(57) ABSTRACT

A modulator has a first grating pattern, and a second grating pattern having a phase shifted from the first grating pattern; a sensor processor receives a first image signal outputted by the first grating pattern, and a second image signal outputted by the second grating pattern; a difference processor calculates a difference between the first image signal and the second image signal; and a compression processor 3005 contains information that indicates a range of the difference to first compression image data. Those make it possible to reduce a data amount of images capable of focus adjustment etc. from later, and to lead to reduction in costs of a storage apparatus.

10 Claims, 44 Drawing Sheets

(58) Field of Classification Search
USPC .................................................. 375/240.08
See application file for complete search history.

(56) References Cited

FOREIGN PATENT DOCUMENTS

| JP | 2003-230138 A | 8/2003 |
| WO | 2017/149687 A1 | 9/2017 |

OTHER PUBLICATIONS

Tajima, K., et al., "Lensless Light-field Imaging with Multi-phased Fresnel Zone Aperture," Proceedings of 2017 IEEE International Conference on Computational Photography (ICCP), May 12-14, 2017, pp. 1-7.
Japanese Office Action dated Oct. 19, 2021, in corresponding Japanese Patent Application No. 2018-057043.

(a) $\Phi_F, \Phi=0$ (b) $\Phi_F, \Phi=\pi/2$ (c) $\Phi_F, \Phi=\pi$ (d) $\Phi_F, \Phi=3\pi/2$

FIG. 27
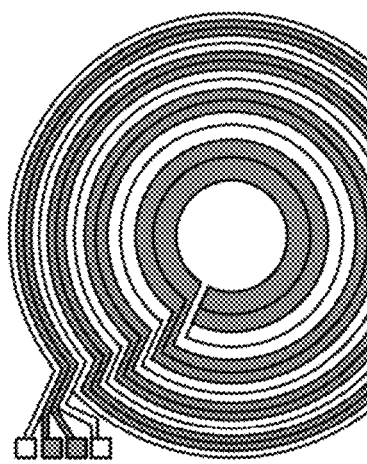
0110 (a)
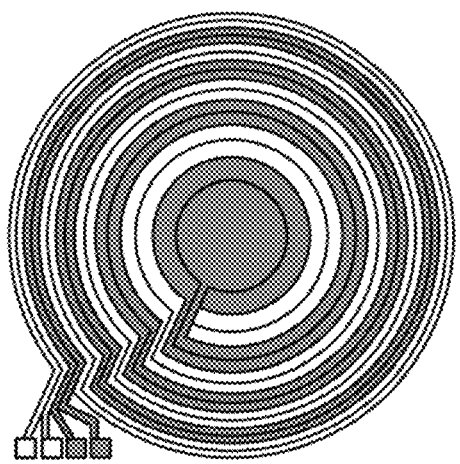
0011 (b)
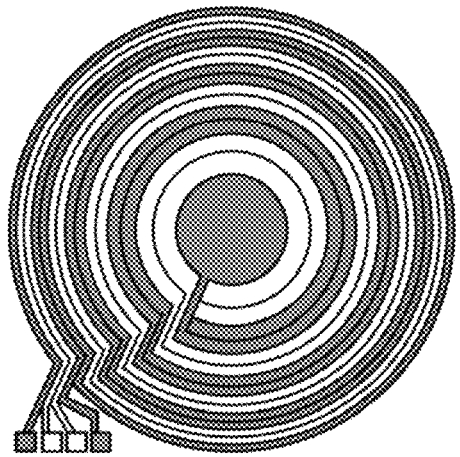
1001 (c)
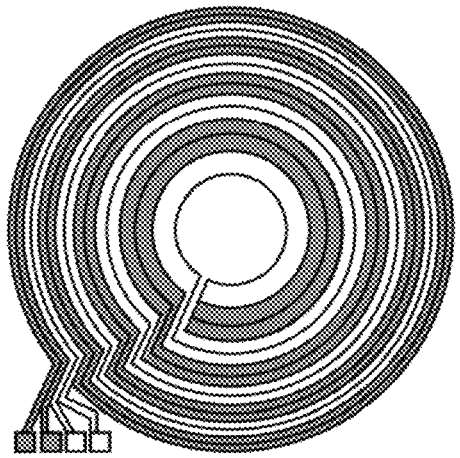
1100 (d)

FIG. 41

| ITEM | VALUE |
|---|---|
| NUMBER OF HORIZONTAL FRAMES | 8 |
| NUMBER OF VERTICAL FRAMES | 8 |
| MINIMUM VALUE [0] | 1960 |
| MAXIMUM VALUE [0] | 2160 |
| ⋮ | ⋮ |
| MINIMUM VALUE [63] | 1920 |
| MAXIMUM VALUE [63] | 2230 |

IMAGING APPARATUS AND IMAGING SYSTEM

CROSS-REFERENCE TO RELATED APPLICATIONS

The present application is based on PCT filing PCT/JP2019/011771, filed Mar. 20, 2019, which claims priority to JP 2018-057043, filed Mar. 23, 2018, the entire contents of each are incorporated herein by reference.

TECHNICAL FIELD

The present invention relates to an imaging apparatus and an imaging system.

BACKGROUND ART

Used as a so-called lensless imaging apparatus has been an apparatus in which a light beam(s) from a photographed subject is detected as spatial frequencies of moire fringes through a zone plate (FZP) and an image of the subject is reconstructed from a Fourier transform image of the moire fringes (for example, Patent Document 1).

RELATED ART DOCUMENTS

Patent Documents

Patent Document 1: International Publication WO 2017/149687

SUMMARY OF THE INVENTION

Problems to be Solved by the Invention

The lensless imaging apparatus not using a lens as described above is expected as an imaging apparatus that can realize a small size and low cost.

Patent Document 1 described above discloses a focus adjustment (refocus), an autofocus, and a distance measurement method when a moire-fringe image is generated from a sensor image captured (photographed) by the lensless imaging apparatus. Recording the sensor image is required for performing the focus adjustment etc. after the photography. However, the sensor image of Patent Document 1 described above is a special image whose subject is not clear, and image capacity of its one image is large, so that if such an image is memorized as it is, a large storage capacity becomes necessary. Consequently, it is desired to reduce the image capacity of the image captured by the lensless imaging apparatus.

Therefore, an object of the present invention is to provide an imaging apparat and an imaging system that reduce and manage the image capacity of the image captured by the lensless imaging apparatus.

The above and other objects and novel features of the present invention will become apparent from the description of the present specification and the accompanying drawings.

Means for Solving the Problems

The following is a brief description of an outline of the typical invention disclosed in the present application.

An imaging apparatus, which captures an image, according to a representative embodiment of the present invention includes: an image sensor configured to convert an optical image and output the converted optical image, the optical image being taken in a plurality of light receiving elements arranged on an imaging surface in an array; a modulator provided on a light receiving surface of the image sensor and configure to modulate an intensity of light; a signal processor configured to receive image signals outputted from the image sensor; a difference processor configured to calculate a difference between the image signals received by the signal processor and to generate a first difference data based on the difference; a data converter configured to generate a first compression image data based on the first difference data and a range of the difference between the image signals by the difference processor; a compressor configured to compress the first compression image data generated by the data converter; and an output unit configure to output the data compressed by the compressor, in which the modulator has a first grating pattern composed of a plurality of lines and a second grating pattern that has a phase shifted from the first grating pattern, the signal processor receives a first image signal outputted by the first grating patter and a second image signal outputted by the second grating pattern, the difference processor calculates a difference between the first image signal and the second image signal, and the compressor contains information that indicates a range of the difference to the first compression image data.

Effects of the Invention

The effects obtained by typical embodiments of the invention disclosed in the present application will be briefly described below.

That is, according to the representative embodiment of the present invention, capacity of an image captured by a lensless imaging apparatus can be reduced and managed.

BRIEF DESCRIPTIONS OF THE DRAWINGS

FIG. 27 is views each showing an example of a modulator in the time-division fringe scan;

FIG. 41 is a view showing an image information example added to a compressed file in the example which divides the difference image data into blocks;

DETAILED DESCRIPTION OF PREFERRED EMBODIMENTS

Figure 1:
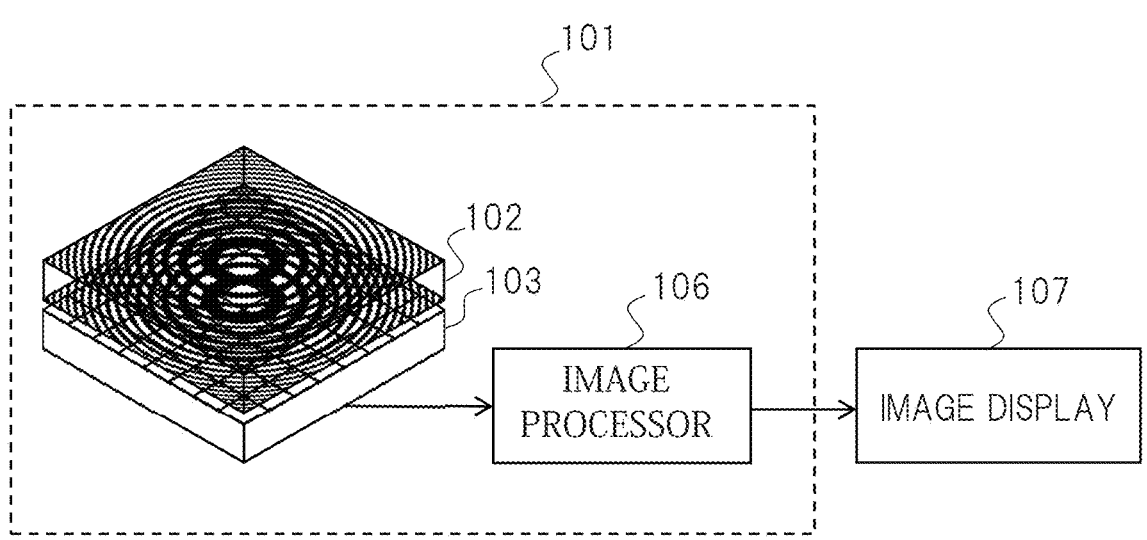
FIG. 1 is a view showing a basic embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Also, components having the same function are denoted by the same reference characters throughout the drawings for describing the embodiments, and the repetitive description thereof is omitted.

Hereinafter, embodiments of the present invention will be described in detail with reference to the accompanying drawings. Note that components having the same function are denoted by the same reference characters throughout the drawings for describing the embodiments, and the repetitive description thereof will be omitted. Meanwhile, parts described with reference numerals in one drawing may be referred to with the same reference numerals although not shown again in the description of other drawings.

First Embodiment

<Principle of Photographing Object at Infinity>

FIG. 1 is an explanatory diagram showing an example of a basic configuration of an imaging apparatus 101 according to a first embodiment. The imaging apparatus 101 is an apparatus that acquires (images) an image of an external object without using a lens for forming an image(s). As shown in FIG. 1, the imaging apparatus 101 includes a modulator 102, an image sensor 103, and an image processor (processor) 106.

Figure 2:
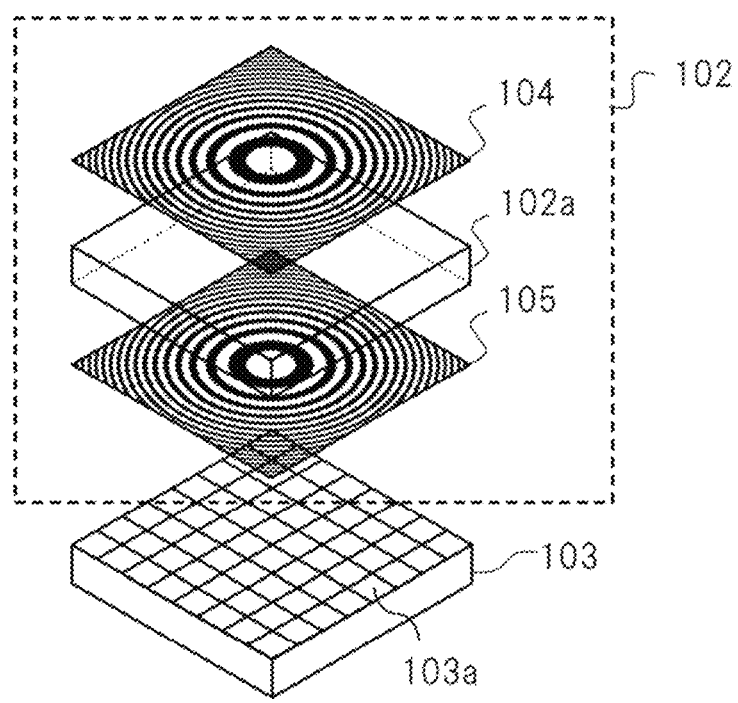
FIG. 2 is a view showing an example of a modulator.

The modulator 102 will be described with reference to FIG. 2. FIG. 2 is a view showing an example of the modulator. The modulator 102 is closely fixed to a light receiving face of the image sensor 103, and has a configuration in which a front-side grating pattern 104 and a back-side grating pattern 105 are formed on a front side and a back side of a grating substrate 102a, respectively. Thus, the modulator 102 is provided on the light receiving face of the image sensor 103. The grating substrate 102a is made of a transparent material such as glass or plastic.

Hereinafter, an image sensor 103 side of the grating substrate 102a is referred to as a back surface, and an opposing surface, that is, a photographed target side is referred to as a front surface. Each of the front-side grating pattern 104 and the back-side grating pattern 105 is composed of concentric grating patterns, an interval between which is inversely proportional to a radius from its center toward its outside, that is, a pitch between which narrows (becomes smaller).

Each of the front-side grating pattern 104 and the back-side grating pattern 105 is formed by evaporating a metal such as aluminum or chromium through, for example, a sputtering method in a semiconductor process. Shades are given by the pattern on which the metal is deposited and the pattern on which the metal is not deposited.

Incidentally, formation of the front-side grating pattern 104 and the back-side grating pattern 105 is not limited to this, and may be formed so as to give the shades, for example, by printing with an inkjet printer or the like.

Further, here, visible light has been described as an example. In photographing far infrared rays, however, a material transparent to far infrared rays such as germanium, silicon, and chalcogenide may be used as the grating substrate 102a, a material transparent to a wavelength to be a photographed target may be used, and a material that cuts off metal etc. may be used for the front-side grating pattern 104 and the back-side grating pattern 105.

Incidentally, here, a method of forming the front-side grating pattern 104 and the back-side grating pattern 105 on the grating substrate 102a in order to realize the modulator 102 has been described, but the present invention is not limited to this.

Figure 3:
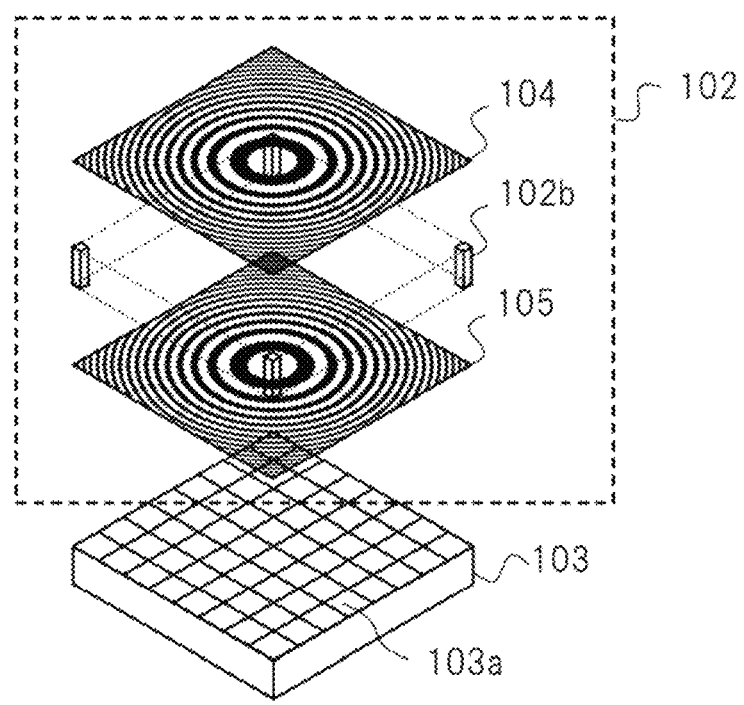
FIG. 3 is a view showing a modulator of a basic embodiment.

Here, an example of another modulator will be described with reference to FIG. 3. FIG. 3 is an example of another modulator. That is, as shown in FIG. 3, the another modulator may be realized by a configuration etc. of forming the front-side grating pattern 104 and the back-side grating pattern 105 on thin films and holding them with supporting members 102b.

Light transmitting the front-side grating pattern 104 and the back-side grating pattern 105 is received by the image sensor 103 after its intensity is modulated by their grating patterns. The image sensor 103 is configured by, for example, a CCD (Charge Coupled Device) image sensor, a CMOS (Complementary Metal Oxide Semiconductor) image sensor, or the like. Thus, the modulator 102 modulates the light intensity.

Pixels 103a, which are light receiving elements, are regularly arranged in a grid (array) state on a surface of the image sensor 103. The image sensor 103 converts a light image received by the pixel 103a into an image signal which is an electric signal. Consequently, the image sensor 103 converts, into the image signal, an optical image(s) captured (fetched) by the plurality of light receiving elements arranged in the array state on an imaging surface, and then outputs the converted image signal. Returning to FIG. 1, the image signal outputted from the image sensor 103 is subjected to an image processing by the image processor 106, which is an image processing unit, and is outputted to an image display 107 and the like. Consequently, the image processor 106 receives the image signal outputted from the image sensor 103.

Figure 4:
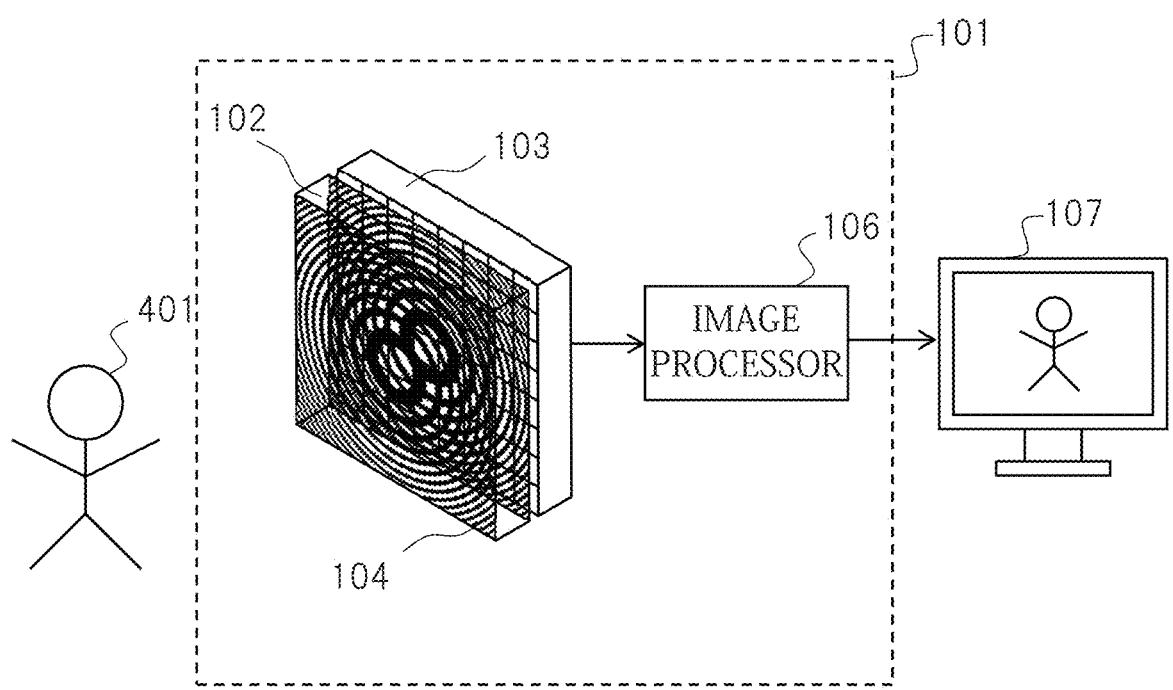
FIG. 4 is a view showing a state of photographing an external object by using the basic embodiment.

FIG. 4 is an explanatory diagram showing an example of photography by the imaging apparatus 101 in FIG. 1. FIG. 4 shows an example in which a subject 401 is photographed by the imaging apparatus 101 and is displayed on the image display 107. As shown in the figure, in photographing the subject 401, a surface of the modulator 102 with respect to the subject 401, specifically, a face of the grating substrate 102a on which the front-side grating pattern 104 is formed is photographed so as to face the subject 401 straightly.

Figure 5:
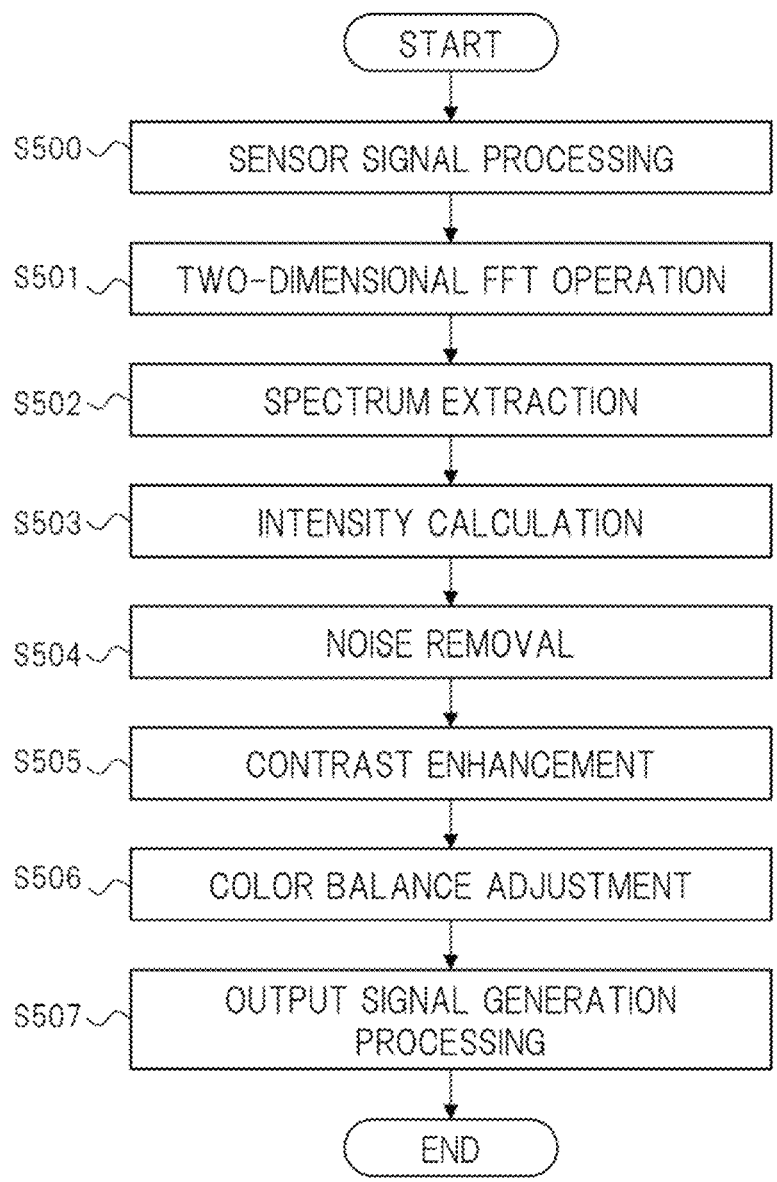
FIG. 5 is a view showing a processing flow of an image processor in the basic embodiment.

Subsequently, an outline of an image processing performed by the image processor 106 will be described. Here, a procedure of the image processing will be described with reference to FIG. 5. FIG. 5 is a flowchart showing the outline of the image processing performed by the image processor 106 included in the imaging apparatus 101 of FIG. 1.

First, a moire fringe image for each of RGB (Red, Green, Blue) components is generated from the signal outputted from the image sensor 103 by a demosaicing processing etc. in processings of step S500. Next, a frequency spectrum is obtained for the moire fringe image by a developing processing that uses a two-dimensional Fourier transform operation such as a fast Fourier transform (FFT: Fast Fourier Transform) for each RGB component (S501).

Subsequently, data in a necessary frequency region is extracted from (cut out of) the frequency spectra obtained from the processings of step S501 (S502), and thereafter an image(s) is obtained by calculating intensities of the frequency spectra (S503). Then, a noise removing processing is performed on the obtained image (S504) and, subsequently, a contrast enhancing processing (S505) and the like are performed. Thereafter, a color balance of the image is adjusted (S506), and the image is outputted as a photographed image (S507). Thus, the image processing by the image processor 106 ends.

Subsequently, the imaging principle of the imaging apparatus 101 will be described. First, the concentric front-side grating pattern 104 and back-side grating pattern 105, each pitch of which becomes smaller (is narrowed) in inverse proportion to a radius from a center as shown in FIG. 2 etc., are defined as follows. It is assumed that a laser interferometer or the like causes a spherical wave close to a plane wave to interfere with a plane wave used as reference light. If a radius from a reference coordinate which is a center of the concentric circle is "r" and a phase of a spherical wave at the radius is "φ(r)", this can be expressed by using a coefficient β that determines the magnitude of a bend of a wavefront.

$$\varnothing(r) = \beta r^2 \quad \text{Expression (1)}$$

In spite of the spherical wave, it is represented by the square of the radius r because it is a spherical wave close to a plane wave and can be approximated only by the lowest order of expansion. When a plane wave interferes with light that has this phase distribution, an intensity distribution of interference fringes as shown below is obtained.

$$I(r) = \frac{1}{4}|\exp i\phi(r) + 1|^2 = \frac{1}{2}(1 + \cos\varnothing) = \frac{1}{2}(1 + \cos\beta r^2) \quad \text{Expression (2)}$$

This results in concentric stripes each having a bright line at a position of a radius that satisfies the following.

$$\Phi(r)=\beta r^2=2n\pi(n=0,1,2,\ldots)$$  Expression (3)

When a pitch between the stripes is "p", the following is obtained and it can be seen that the pitch narrows in inverse proportion to the radius.

$$p\frac{d}{dr}\Phi(r)=2p\beta r=2\pi,\ p(r)=\frac{\pi}{\beta r}$$  Expression (4)

A plate having such stripes is called a Fresnel zone plate or a Gabor zone plate. A grating pattern having a transmittance distribution proportional to the intensity distribution defined by Expression (2) is used as each of the front-side grating pattern 104 and back-side grating pattern 105 shown in FIG. 1.

Figure 6:
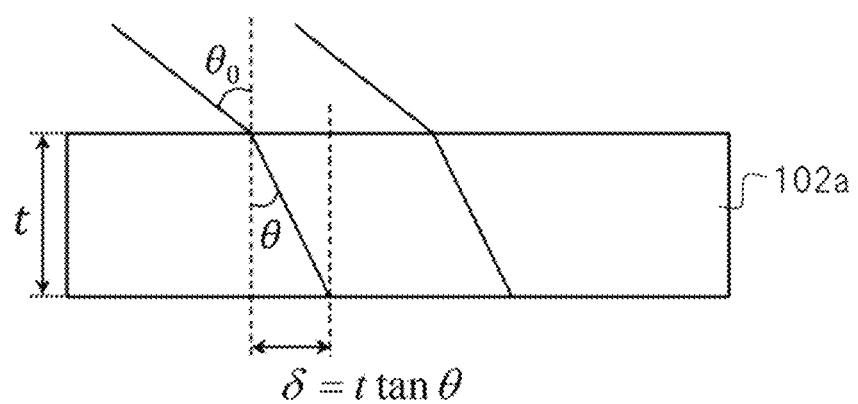
FIG. 6 is a diagram for explaining that an image projected from a front surface to a back surface of a grating substrate by obliquely incident parallel light causes an in-plane deviation.

Here, an incident state will be described with reference to FIG. 6. FIG. 6 is a view showing an incident state. As shown in FIG. 6, it is assumed that parallel light is incident, at an angle θ0, on the modulator 102 which has a thickness "t" and in which such a grating pattern is formed on each of its both surfaces. In terms of geometrical optics, when a refraction angle in the modulator 102 is "θ", light multiplied by a transmittance of a front grating(s) is incident on a back surface with only a shift of δ=t·tan θ. If respective centers of the two concentric gratings are temporarily formed so as to be aligned with each other, the transmittances of back gratings are mutually shifted only by δ, thereby leading to being multiplied. At this time, the following intensity distribution is obtained.

$$I(x,y)I(x+\delta,y)=\frac{1}{4}[1+\cos\beta(x^2+y^2)][1+\cos\beta((x+\delta)^2+y^2)]$$

$$=\frac{1}{8}[2+4\cos\beta(r^2+\delta x)\cos\delta\beta x+\cos2\beta(r^2+\delta x)+\cos2\delta\beta x]$$  Expression (5)

It can be seen that the fourth term of this expansion formula creates, over the entire surface of an overlapping region, stripe patterns which have an equal interval therebetween and are straight in a direction of displacement between the two gratings. A stripe generated at a relatively low spatial frequency by mutually overlapping the above-mentioned stripe patterns is called a moire fringe. Such straight, regularly spaced fringes bring sharp peaks in the spatial frequency distribution obtained by the two-dimensional Fourier transform of the detected image.

From its frequency value, a value of δ, that is, an incident angle θ of a light beam can be obtained. It is clear that such moire fringes uniformly obtained over the entire surface are generated at the same pitch irrespective of the direction of displacement due to symmetry of the concentric grating arrangement. Such stripes are obtained because the grating pattern is formed by a Fresnel zone plate or a Gabor zone plate. Any grating patterns may be used as long as the moire fringes arranged uniformly and at regular intervals over the entire surface can be obtained.

Here, when only the components having the sharp peaks 5, i.e., $$M(x,y)=\tfrac{1}{8}(2+\cos 2\delta\beta)$$  Expression (6)

are extracted (fetched) from Expression 5, its Fourier spectrum becomes the followings.

$$\mathcal{F}\{M(x,y)\}=\frac{1}{8}\mathcal{F}[2+\cos\gamma\beta x]$$

$$=\frac{1}{4}\delta(u,v)+\frac{1}{8}\delta\!\left(u+\frac{\delta\beta}{\pi},v\right)+\frac{1}{8}\delta\!\left(u-\frac{\delta\beta}{\pi},v\right)$$  Expression (7)

Here, "F" represents a Fourier transform operation, "u." and "v" are spatial frequency coordinates in x and y directions, and "δ" with parentheses is a delta function. From this result, it can be seen that the peaks of the spatial frequencies of the moire fringes occur at positions of u=±δβ/n in the spatial frequency spectra of the detected image.

Figure 7:
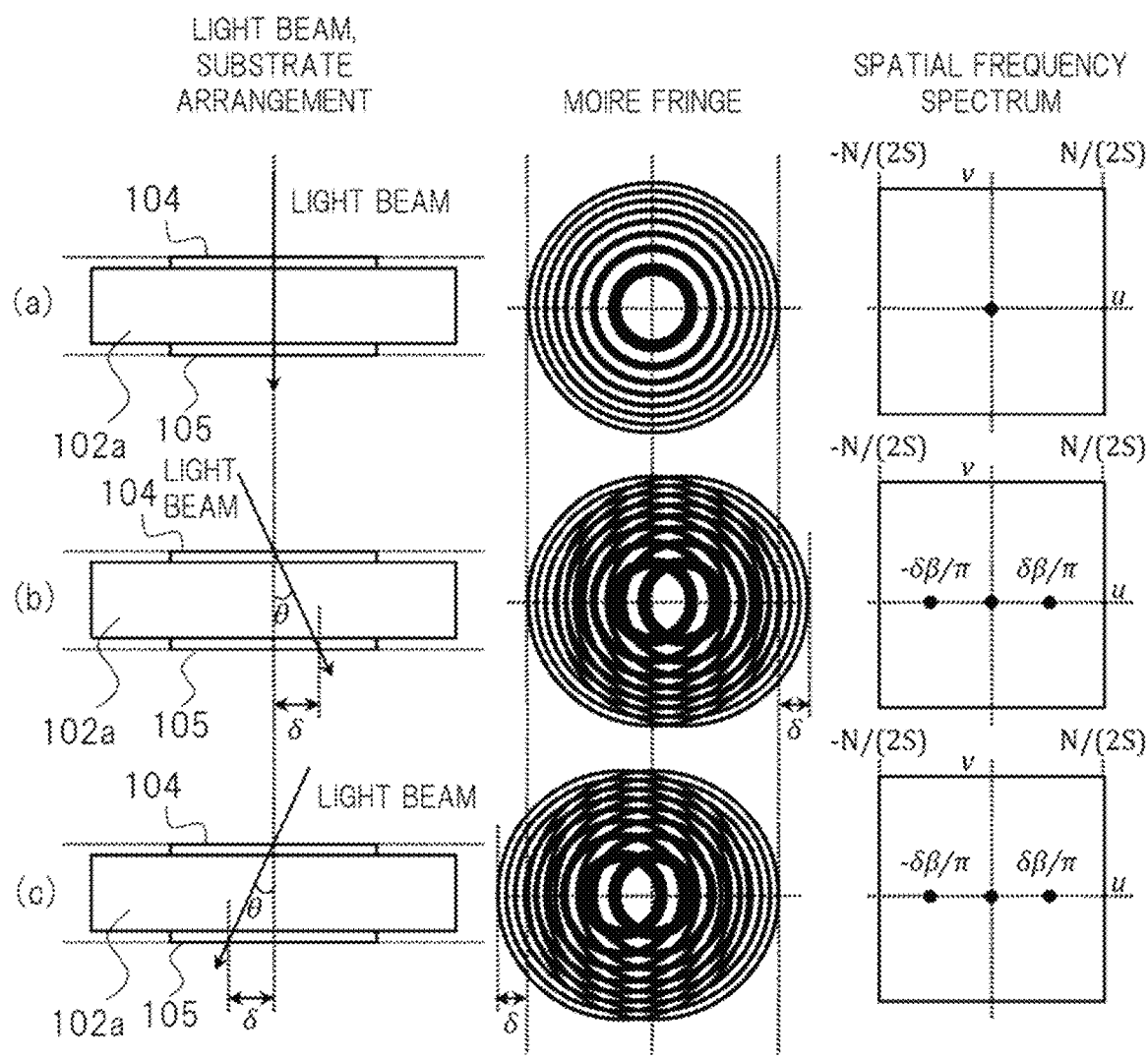
FIG. 7 is schematic diagrams for explaining generation of moire fringes and frequency spectra when axes of gratings on both surfaces of the grating substrate are aligned.

Such states are shown in FIG. 7. FIG. 7 shows a view of arrangements of a light beam and the modulator 102, and shows schematic diagrams of a moire fringe and a spatial frequency spectrum. Shown from left to right in FIG. 7 are the view of the arrangements of the light beam and the modulator 102, and the schematic diagrams of the moire fringe and the spatial frequency spectrum. FIG. 7(a) shows a case of a vertical incidence, FIG. 7(b) shows a case where a light beam is incident at an angle θ from left, FIG. 7(c) shows a case where light is incident at an angle θ from the right.

Axes of the front-side grating pattern 104 formed on a front side of the modulator 102 and the back-side grating pattern 105 formed on a back side thereof are aligned with each other. In FIG. 7(a), since shadows of the front-side grating pattern 104 and the back-side grating pattern 105 match with each other, no moire fringes occur.

In FIGS. 7(b) and 7(c), since the front-side grating pattern 104 and the back-side grating pattern 105 are equal in displacement, the same moire occurs and their peak positions of the spatial frequency spectra also coincide with each other. Therefore, it is impossible to determine whether the incident angle of the light beam indicates the case of FIG. 7(b) or the case of FIG. 7(c).

Figure 8:
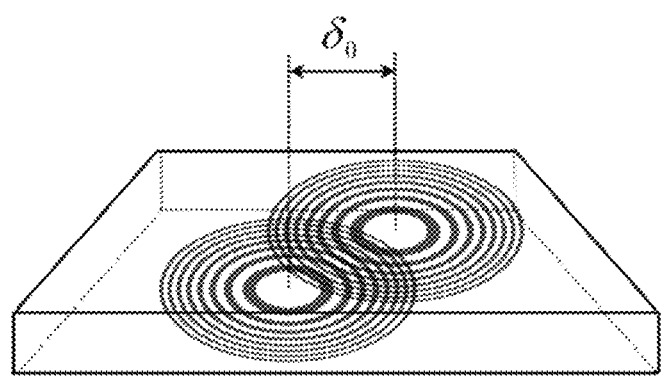
FIG. 8 is a schematic diagram at a time of arranging an axis of a front-surface grating and an axis on a back-surface grating so as to be shifted from each other.

A method for avoiding this will be described with reference to FIG. 8. FIG. 8 is a view showing an arrangement example of grating patterns. As shown in FIG. 8, the two front-side grating pattern 104 and back-side grating pattern 105 requires being previously relatively shifted with respect to an optical axis so that the respective shadows of the two grating patterns are shifted and overlap with each other even for the light beam perpendicularly (vertically) incident on the modulator 102. If it is assumed that the relative shift between the shadows of the two gratings with respect to an on-axis vertical incident plane wave is δ0, the shift δ caused by the plane wave at the incident angle θ can be expressed as follows.

$$\delta=\delta_0+t\tan\theta$$  Expression (8)

At this time, the peak of the spatial frequency spectra of the moire fringes of the light beam at the incident angle θ is at the following position on a plus side of the frequency.

$$u=\frac{\delta\beta}{\pi}=\frac{1}{\pi}(\delta_0+t\tan\theta)\beta$$  Expression (9)

If it is assumed that a size of the image sensor is "S" and the number of pixels in each of the x direction and y direction of the image sensor is "N", a spatial frequency spectrum (spectra) of a discrete image(s) by the two-dimensional Fourier transform is obtained in a range of $-N/(2S)$ to $+N/(2S)$.

From this, considering that the plus-side incident angle and the minus-side incident angle are equally light-received, it is proper for the spectral peak position of the moire fringes due to the vertically incident plane wave ($\theta$=0) to be set at: the origin (DC: direct current component) position; and a central position between it and, for example, the plus-side-end frequency position, that is, a spatial frequency position of the following.

$$\frac{\delta_0 \beta}{\pi} = \frac{N}{4S} \qquad \text{Expression (10)}$$

Thus, it is proper to set the following as a relative-central position displacement between the two gratings.

$$\delta_0 = \frac{\pi N}{4\beta S} \qquad \text{Expression (11)}$$

Figure 9:
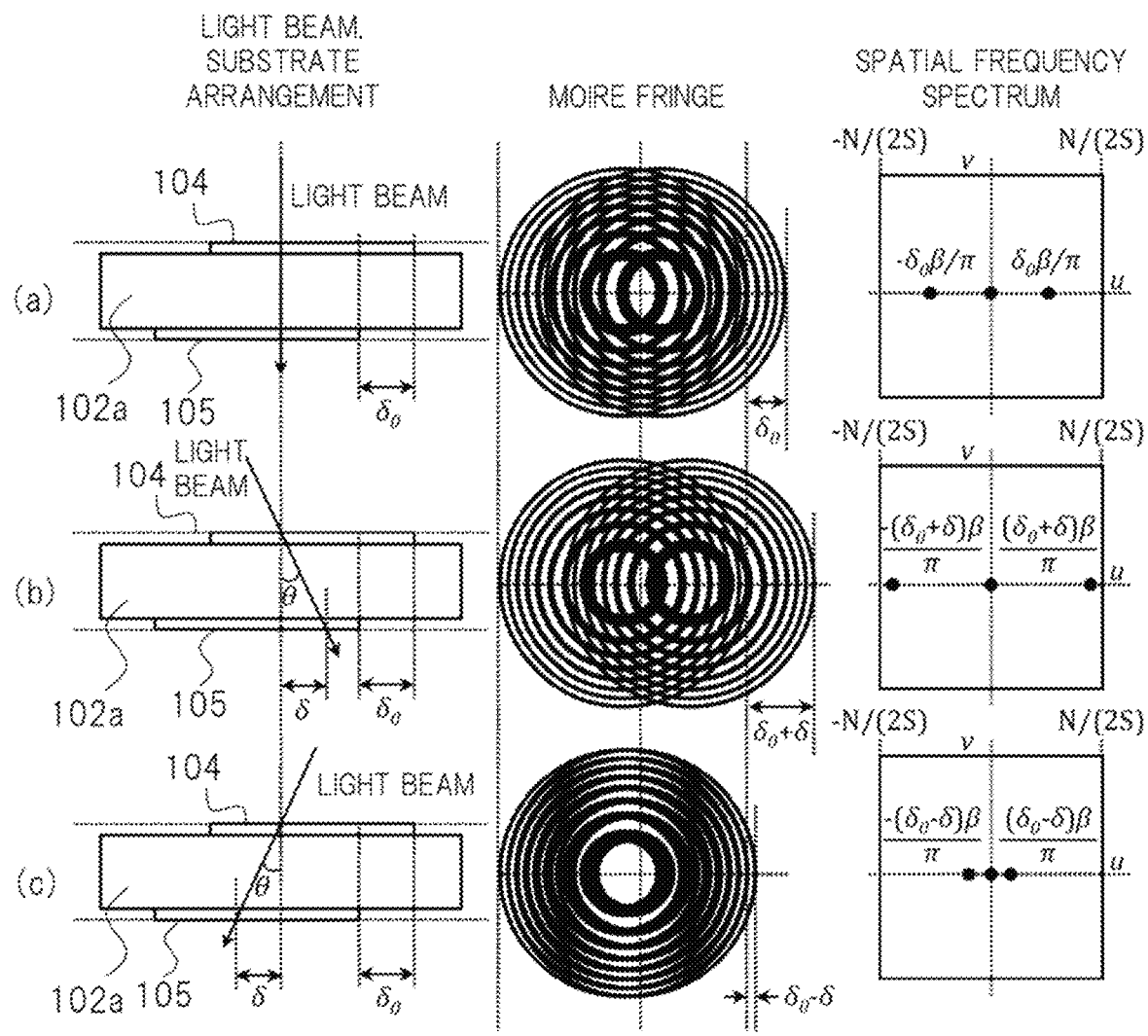
FIG. 9 is schematic diagrams for explaining generation of moire fringes and frequency spectra at a time of arranging the gratings on the both surfaces of the grating substrate so as to be shifted from each other.

FIG. 9 is a schematic diagram showing generation of moire fringes and frequency spectra when the front-side grating pattern 104 and the back-side grating pattern 105 are shifted from each other and arranged. As in FIG. 7, its left side shows a view of arrangements of the light beam and the modulator 102; its central row shows the moire fringes; and its right side shows the spatial frequency spectra. Additionally, FIG. 9($a$) shows a case where the light beam is vertically incident; FIG. 9($b$) shows a case where the light beam is incident at an angle $\theta$ from left; and FIG. 9($c$) shows a case where the light beam is incident at an angle $\theta$ from right.

The front-side grating pattern 104 and the back-side grating pattern 105 are arranged so as to be shifted by $\delta 0$ in advance. Consequently, moire fringes also occur in FIG. 9($a$), and its peak appears in the spatial frequency spectra. As described above, a shifted amount $\delta 0$ is set so that a position of the peak appears at a center of a one-side spectrum range from the origin.

At this time, since the shift $\delta$ is pointed in a direction of further increasing in FIG. 9($b$) and is pointed in a direction of decreasing in FIG. 9($c$), a difference between FIGS. 9($b$) and 9(C) can be determined from the peak position of the spectra unlike FIG. 7. A spectrum image of this peak is a luminescent spot indicating a light flux at infinity, and is nothing but an image photographed by the imaging apparatus 101 in FIG. 1.

If it is assumed that the maximum angle of incident angles of parallel light that can be received is $\theta$max, the maximum angle of view that can be light-received by the imaging apparatus 101 with $$u_{max} = \frac{1}{\pi}(\delta_0 + t\tan\theta_{max})\beta = \frac{N}{2S} \qquad \text{Expression (12)}$$

is given by the following.

$$\tan\theta_{max} = \frac{\pi N}{4t\beta S} \qquad \text{Expression (13)}$$

By analogy with the above and image formation using a general lens, considering that parallel light having a view angle $\theta$max is focused at and light-received by an end of the image sensor, an effective focal length of the imaging apparatus 101 using no lens can be considered as equivalent to the following.

$$f_{eff} = \frac{S}{2t\tan\theta_{max}} = \frac{2t\beta S^2}{\pi N} \qquad \text{Expression (14)}$$

Here, it can be seen from Expression (13) that the angle of view can be changed by a thickness "t" of the modulator 102, and a coefficient (s) "$\beta$" of the front-side grating pattern 104 and/or back-side grating pattern 105. Thus, for example, if the modulator 102 has a configuration shown in FIG. 3 and has a function capable of changing (altering) a length of a supporting member 102$b$, this also makes it possible to change the angle of view during its photography and to photograph the image(s).

Incidentally, the method of calculating the spatial frequency spectra from the moire fringes has been described by taking the fast Fourier transform as an example, but the present invention is not limited to this. The above method is realizable also by using the discrete cosine transformation (DCT: Discrete Cosine Transform) etc., and can further reduce an amount of calculation, too.

Figure 10:
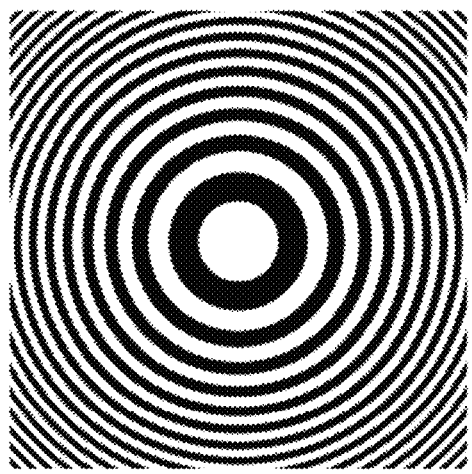
FIG. 10 is a view showing an example of a grating pattern.
Figure 11:
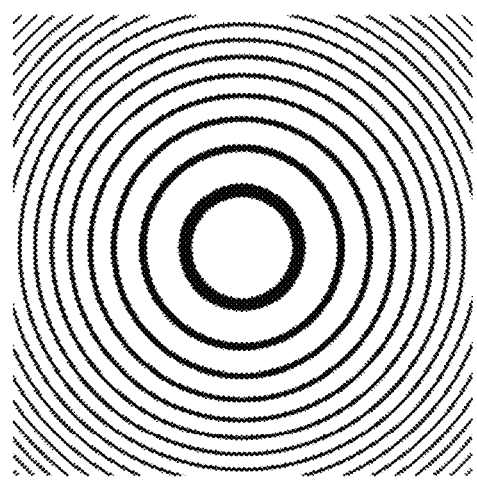
FIG. 11 is a view showing another example of a grating pattern.

Additionally, the transmittance distributions of the front-side grating pattern 104 and back-side grating pattern 105 have been described by assuming that they have sinusoidal characteristics as shown in Expression (2). However, the distributions may have such assumed components as fundamental frequency components of the grating patterns. For example, as shown in FIG. 10, each transmittance of the grading patterns can be also binarized and, further, as shown in FIG. 11, it is also conceivable to change duties of a high-transmittance grating region and a low-transmittance grating region and to enlarge a width of the high-transmittance region to enhance its transmittance. This makes it possible to also obtain an effect such as suppression of diffraction from the grating pattern and to reduce deterioration in a photographed image(s).

Figure 12:
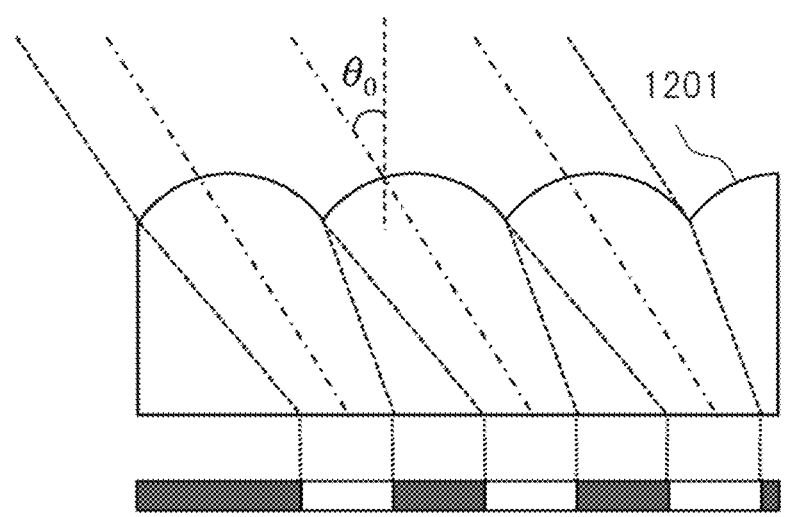
FIG. 12 is a view showing yet another example of a grating pattern.

Further, the front-side grating pattern 104 and the back-side grating pattern 105 may be realized by phase modulation instead of transmittance modulation. For example, as shown in FIG. 12, by using the grating substrate 102$a$ as a cylindrical lens 1201, an intensity modulation pattern as shown in FIG. 12 can be generated on the image sensor 103, so that the image formation (imaging) becomes possible similarly to discussion having been made thus far. This makes it possible to reduce loss of the light amount due to a shielding part of the front-side grating pattern 104, improve a light use efficiency, and also obtain an effect of suppressing the diffraction from the grating pattern. The grating substrate in FIG. 12 has been realized as a lens, but may also be realized by a phase modulation element having the same effect.

In the above description, every incident light beam has only one incident angle at the same time. However, in order for the imaging apparatus 101 to actually act as a camera, it must be assumed that light beams with a plurality of incident angles are incident simultaneously. The light beams with such a plurality of incident angles already overlap with images of a plurality of front-side gratings at a time of being incident on the back-side grating pattern. If their gratings generate moire fringes mutually, it is concerned that the generated moire fringes become noise which hinders detection of moire fringes with the back-side grating pattern 105 as a signal component.

However, mutual overlap with the images of the front-side grating patterns 104 actually causes no peak of the moire image, and the peak occurs only in an area overlapping with the back-side grating pattern 105 and the front-side grating pattern. Its reason will be described below.

First, a major difference is that the mutual overlap of shadows of the front-side grating patterns 104 due to light beams having a plurality of incident angles is brought by not their products but their sums. In a case where the shadow of the front-side grating pattern 104 due to a light beam having one incident angle overlaps with the back-side grating pattern 105, the intensity distribution of the light beam after transmission of the back-side grating pattern 105 is obtained by multiplying, by the transmittance of the back-side grating pattern 105, the light intensity distribution that is the shadow of the front-side grating pattern 104.

In contrast, mutual overlap of shadows caused by a plurality of light beams that have different angles and are incident on the front-side grating pattern 104 is brought by not their products but their sums since it is based on overlap of the light beams. In a case of the sums, the following distribution is obtained by multiplying a distribution of the gratings of the original Fresnel zone plate by a distribution of the moire fringes.

$$I(x, y) + I(x+\delta, y) = \frac{1}{2}[1 + \cos\beta(x^2 + y^2)] + \frac{1}{2}[1 + \cos\beta((x+\delta)^2 + y^2)]$$
$$= 1 + \cos[\beta(r^2 + \delta x)]\cos\delta\beta x$$

Expression (15)

Therefore, its frequency spectra are represented by an overlap integral of each frequency spectrum.

Consequently, even if a moire spectrum has a sharp peak by itself, a ghost of a frequency spectrum of the Fresnel zone plate is actually generated only at its peak position. That is, no sharp peak occurs in the spectrum. Therefore, the spectrum of the moire image detected even when light beams having a plurality of incident angles are applied always indicates only the moire obtained by the product of the front-side grating pattern 104 and the back-side grating pattern 105, and since the back-side grating pattern 105 is a single, the number of peaks of the spectra to be detected is only one with respect to one incident angle.

Figure 13:
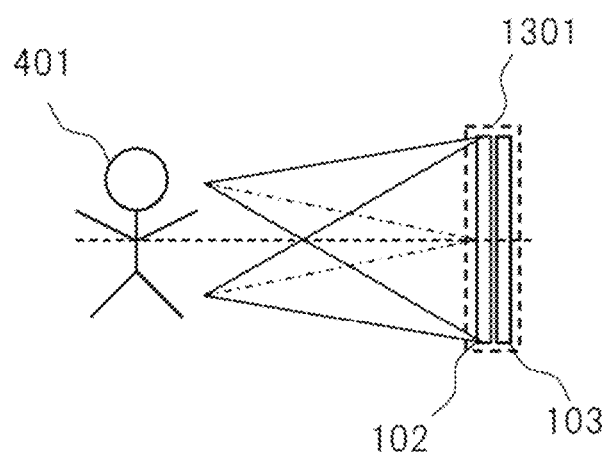
FIG. 13 is a diagram for explaining an angle which a light beam from each point constituting an object forms with respect to a sensor.

Here, a correspondence of parallel light, which has been described thus far, to light emitted from an actual object(s) will be schematically described with reference to FIG. 13. FIG. 13 is an explanatory diagram showing an angle formed by a light beam, which is emitted from each point constituting an object, with respect to the image sensor.

Strictly speaking, a light beam from each point constituting the subject 401 is regarded as a spherical wave radiated from a point light source, and is incident on the modulator 102 and image sensor 103 of the imaging apparatus 101 in FIG. 1 (hereinafter, called a grating sensor integrated substrate 1301 in FIG. 13). At this time, when the grating sensor integrated substrate is sufficiently small in size with respect to or sufficiently far from the subject 401, it can be considered that incident angles of light beams illuminating the grating sensor integrated substrate are the same as (equal to) that from each point.

From a relationship indicating that a spatial frequency displacement $\Delta u$ of the moire with respect to a minute angular displacement $\Delta\theta$ obtained from Expression (9) is 1/S or less which is the minimum resolution of spatial frequencies of the image sensor, a condition for regarding $\Delta\theta$ as parallel light can be expressed as follows.

$$\Delta u = \frac{1}{\pi}\beta t\Delta\theta \leq \frac{1}{S}, \Delta\theta \leq \frac{\pi}{S\beta t}$$

Expression (16)

Under this condition, an object at infinity can be imaged by the imaging apparatus according to the present invention.

<Principle of Photographing Finite-Distance Object>

Figure 14:
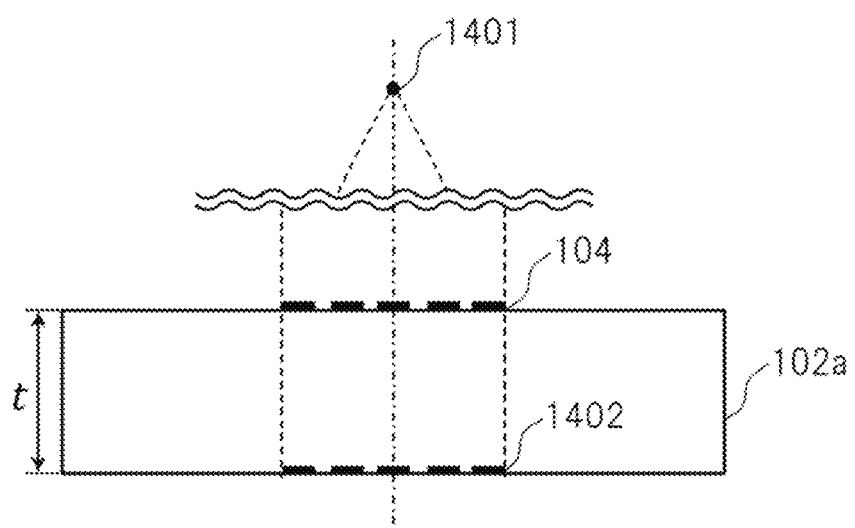
FIG. 14 is a view showing that a front-side grating pattern is projected when an object is at an infinite distance.
Figure 15:
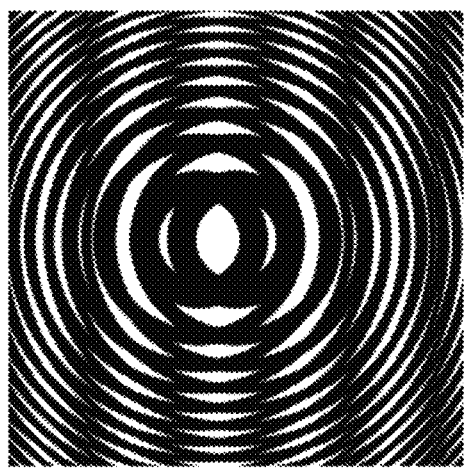
FIG. 15 is a view showing an example of moire fringes generated when the object is at the infinite distance.

Here, FIG. 14 shows a state of projecting the front-side grating pattern 104 onto the back surface in a case of the infinity having been described thus far. In FIG. 14, a spherical wave from a point 1401 forming an object at infinity becomes a plane wave while propagating a sufficiently long distance and irradiates the front-side grating pattern 104, and its projected image 1402 is projected onto a lower surface. In this case, the projected image has substantially the same shape as that of the front-side grating pattern 104. As a result, by multiplying the projected image 1402 by a transmittance distribution of a back-side grating pattern (corresponding to the back-side grating pattern 105 in FIG. 2), linear (straight) moire fringes arranged at equal intervals can be obtained as shown in FIG. 15.

Figure 16:
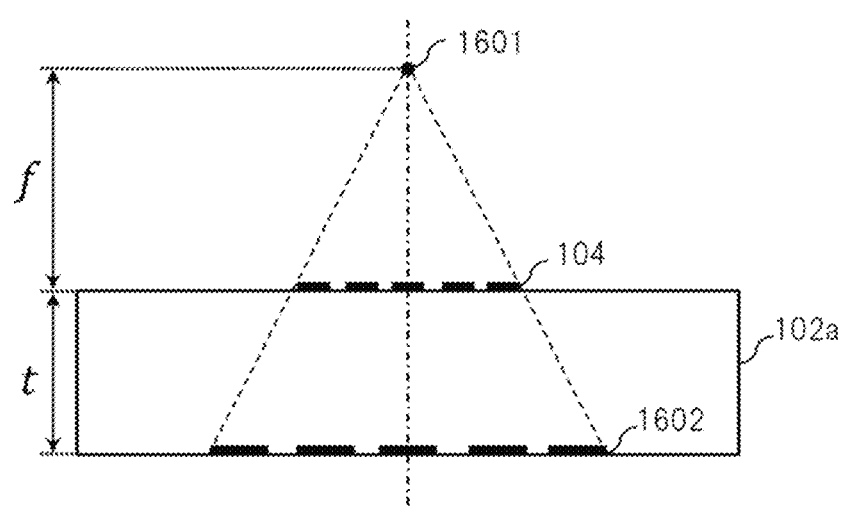
FIG. 16 is a view showing that a front-side grating pattern is expanded when an object is at a finite distance.

Meanwhile, imaging (image formation) of an object at a finite distance will be described. FIG. 16 is an explanatory diagram showing that when the object to be imaged is at a finite distance, projection of the front-side grating pattern 104 onto the back surface is enlarged more than the front-side grating pattern 104. As shown in FIG. 16, when a spherical wave from a point 1601 constituting the object irradiates the front-side grating pattern 104 and its projected image 1602 is projected onto a lower surface, the projected image is enlarged substantially uniformly. Incidentally, this enlargement ratio $\alpha$ can be calculated as follows by using a distance f from the front-side grating pattern 104 to the point 1601.

$$\alpha = \frac{f+t}{f}$$

Expression (17)

Figure 17:
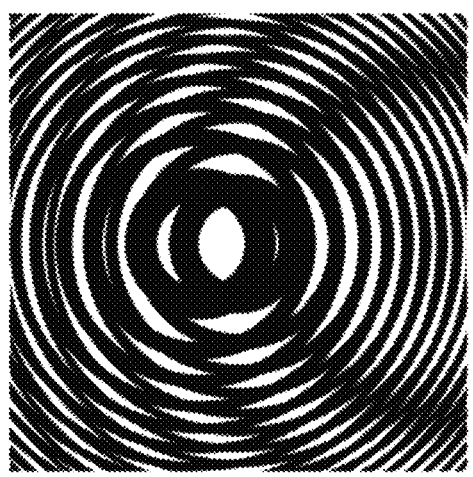
FIG. 17 is a view showing an example of moire fringes generated when the object is at the finite distance.
Figure 18:
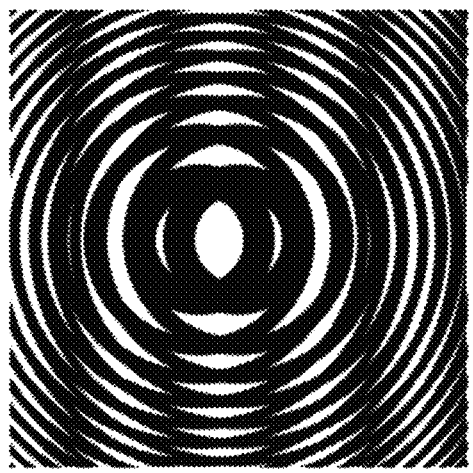
FIG. 18 is a view showing an example of moire fringes obtained by correcting a back-side grating pattern when the object is at the finite distance.

Consequently, as shown in FIG. 17, when parallel light is multiplied, as it is, by a transmittance distribution of the designed back-side grating pattern, the linear moire fringes arranged at equal intervals do not occur. However, if the back-side grating pattern 105 is enlarged in accordance with the uniformly enlarged shadow of the front-side grating pattern 104, as shown in FIG. 18, linear moire fringes arranged at equal intervals can be generated again with respect to the enlarged projected image 1602. Consequently, its correction can be made by setting the coefficient $\beta$ of the back-side grating pattern 105 to $\beta/\alpha^2$.

Thus, the light beams from the point 1601 at a distance that is not necessarily infinite can be selectively developed. This makes it possible to focus on an arbitrary position and perform photographing thereat.

<Simplified Configuration>

Next, a method for simplifying a configuration of the modulator 102 will be described. In the modulator 102, the front-side grating pattern 104 and the back-side grating pattern 105 each having the same shape are formed on the front and back surfaces of the grating substrate 102a so as to be shifted from each other, so that the image(s) is developed by detecting an angle of incident parallel light from the spatial frequency spectrum of the moire fringes. This back-side grating pattern 105 is an optical element, which is in close contact with the image sensor 103 and modulates the intensity of light incident on the image sensor 103, and has the same grating pattern regardless of incident light. Consequently, as shown in FIG. 19, a modulator 1901 from which the back-side grating pattern 105 has been removed may be used, and a processing corresponding to the back-side grating pattern 105 may be executed (performed) by an intensity modulator 1903 in an image processor 1902.

Figure 20:
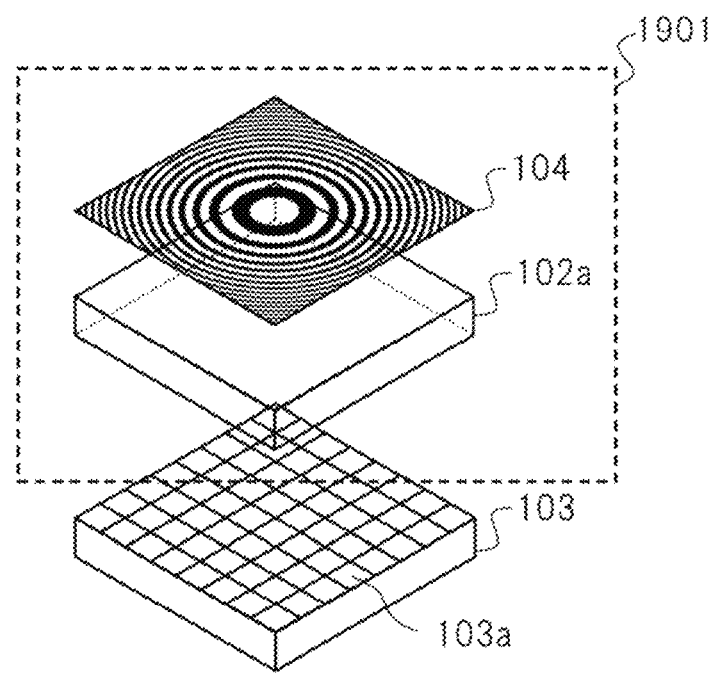
FIG. 20 is a view showing a modulator in the example which realizes the back-side grating pattern by the image processing.

FIG. 20 shows details of a configuration of the modulator 1901 in performing the above processing. With this configuration, the number of grating patterns formed on the grating substrate 102a can be reduced one face. This makes it possible to reduce manufacturing cost of the modulator, and to further improve the light use efficiency.

Figure 19:
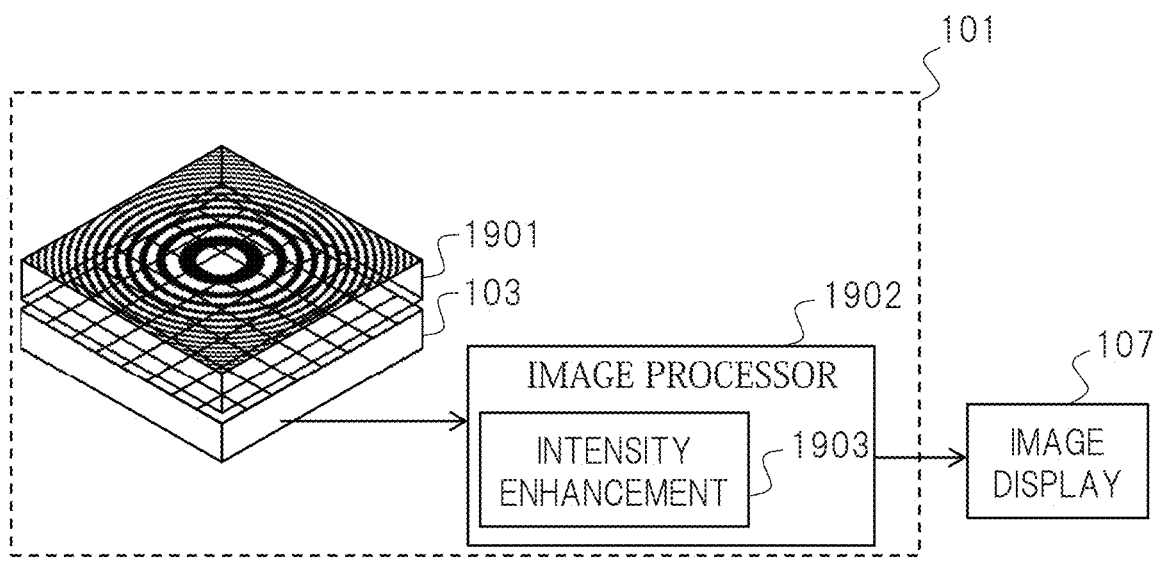
FIG. 19 is a view showing an example which realizes the back-side grating pattern by an image processing.
Figure 21:
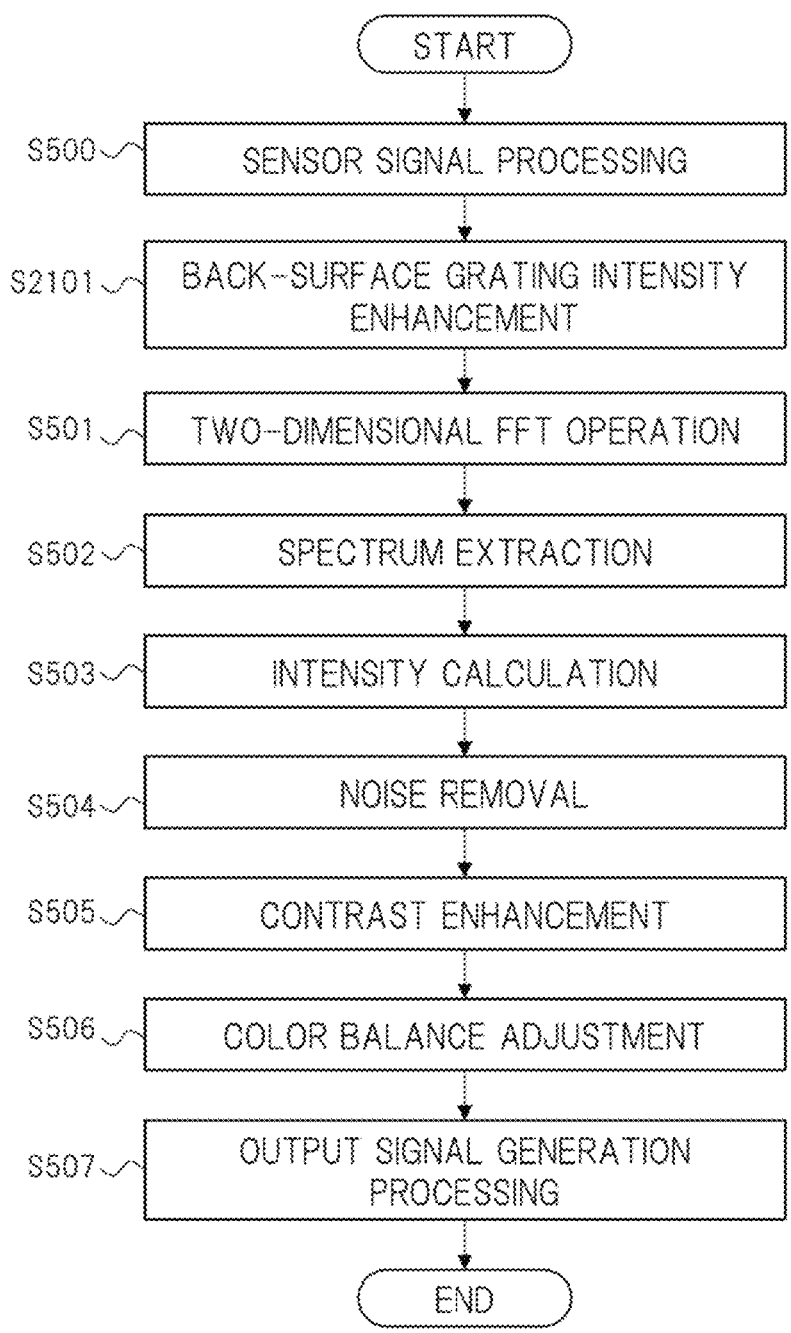
FIG. 21 is a diagram showing a processing flow of an image processor in the example which realizes the back-side grating pattern by the image processing.

FIG. 21 is a flowchart showing an outline of an image processing by the image processor 1902 in FIG. 19. This flowchart of FIG. 21 is different from the flowchart of FIG. 5 in a processing of step S2101. In the processing of step S2101, the image processor 1902 generates a moire-fringe image(s) with respect to the image outputted from the image sensor 103 by the above-described intensity modulator 1903, the moire-fringe image corresponding to the transmission of the back-side grating pattern 105. Specifically, since calculation corresponding to Expression (5) have only to be performed, the image processor 1902 may generate the back-side grating pattern 105 in (at) the intensity modulator 1903 and multiply, by it, the image of the image sensor 103. Further, if the back-side grating pattern 105 is a binarized pattern as shown in each of FIGS. 10 and 11, it can be realized only by setting, to zero, a value of the image sensor 103 in an area corresponding to black. This makes it possible to suppress a scale of a multiplication circuit. Subsequently thereto, since processings in steps S501 to S507 in FIG. 21 are the same as the processings in FIG. 5, their descriptions will be omitted herein.

Incidentally, in this case, a pitch between pixels 103a included in the image sensor 103 needs fineness to such an extent as to sufficiently reproduce the pitch of the front-side grating pattern 104, or needs coarseness to such an extent that the pitch of the front-side grating pattern 104 can be reproduced by the pitch between the pixels 103a. When the grating patterns are formed on both surfaces of the grating substrate 102a, the pitch between the grating patterns does not necessarily need to be resolvable by the pixels 103a of the image sensor 103, and only the moire image may be resolvable. However, when the grating pattern is reproduced by the image processing, the grating pattern and the resolution of the image sensor 103 need to be equal to each other.

Additionally, the processing corresponding to the back-side grating pattern 105 is realized by the intensity modulator 1903. However, since the back-side grating pattern 105 is the optical element which is in close contact with the sensor and modulates the intensity of light incident on the sensor, the above processing can be realized also by effectively setting sensitivity of the sensor in consideration of the transmittance of the back-side grating pattern 105.

<Principle of Changing Focus after Photographing>

Figure 22:
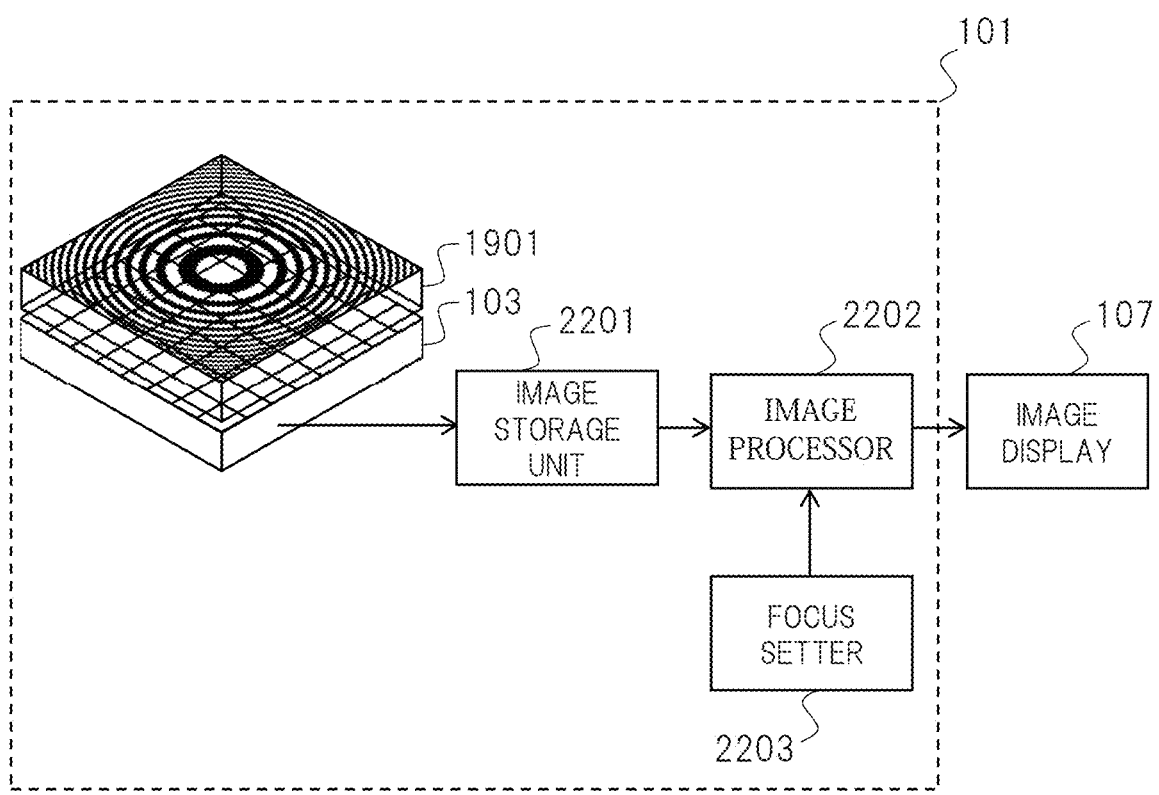
FIG. 22 is a view showing an example which realizes refocusing.

The above-described configuration in which the back-side grating pattern 105 is formed by the image processor also makes it possible to focus on an arbitrary distance after photographing. The configuration in this case is shown in FIG. 22. This configuration is different from that in FIG. 19 in an image storage unit 2201, an image processor 2202, and a focus setter 2203. The image storage unit 2201 is provided to temporarily store an image(s) outputted from the image sensor 103 in order to make the focus adjustable after the photographing. The focus setter 2203 can also set a focus distance by using a knob provided on the imaging apparatus 101, a GUI (Graphical User Interface) of a smartphone, or the like, and the focus setter outputs focus distance information (publicly known distance information for focusing on an arbitrary distance) to the image processor 2202.

Figure 23:
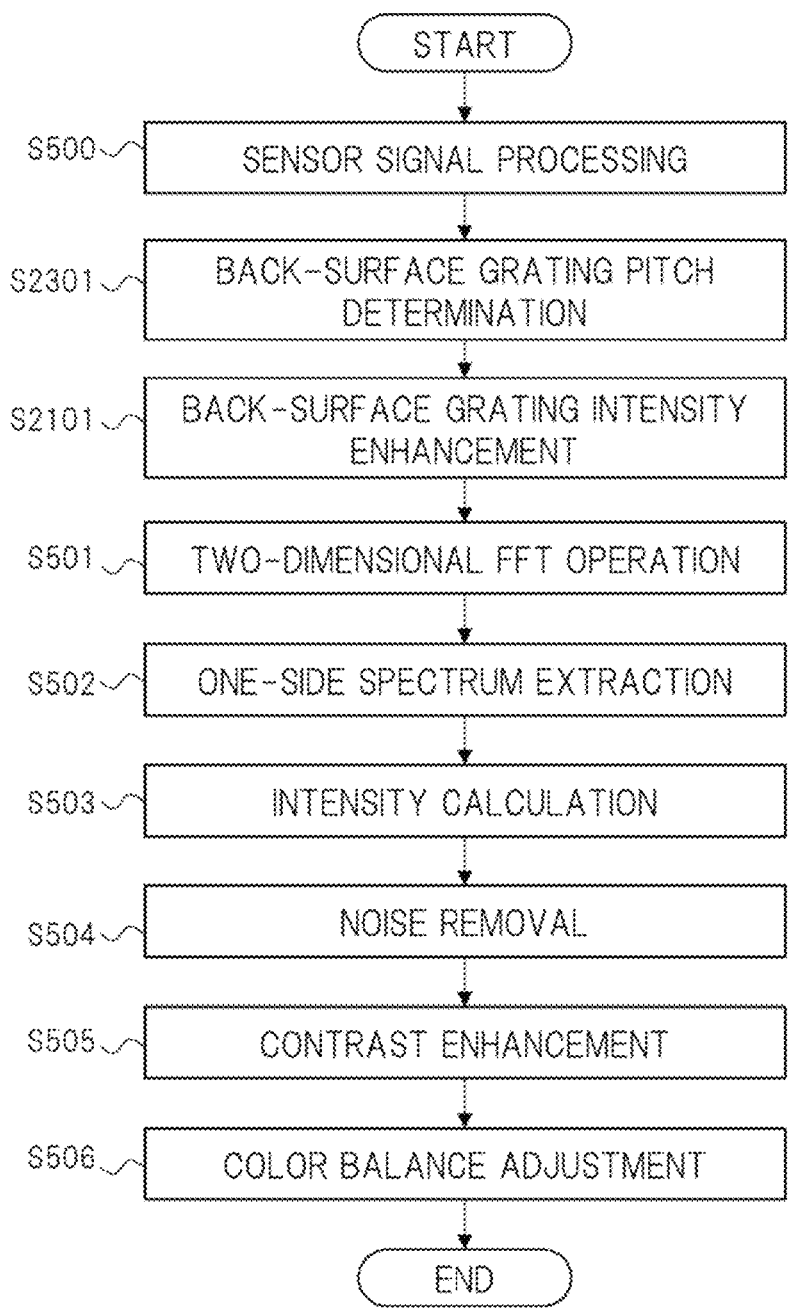
FIG. 23 is a diagram showing a processing flow of an image processor in the example which realizes the refocusing.

FIG. 23 is a flowchart showing an outline of image processings performed by the image processor 2202 in FIG. 22. This flowchart of FIG. 23 is different from the flowchart of FIG. 21 in a processing of step S2301. In the processing of step S2301, an enlargement ratio $\alpha$ is calculated from Expression (17) based on the focus distance information outputted from the above-mentioned focus setter 2203, and the coefficient $\beta$ of the back-side grating pattern 105 is calculated as $\beta/\alpha$. Then, in step S2101, a moire-fringe image corresponding to transmission of the back-side grating pattern is generated based on the coefficient. Subsequently, the processings in steps S501 to S506 of FIG. 23 are the same as the processings of FIG. 5, and so their descriptions will be omitted herein.

According to the above-mentioned method and configuration, the exterior object image can be obtained by a simple operation such as fast Fourier transform (FFT) and, further, the focus is made adjustable to (at) the arbitrary distance after the photographing. In the conventional camera, re-photographing has needed to change the focus. However, in the present embodiment, the photographing is required only one time.

Incidentally, although the method of calculating the spatial frequency spectrum from the moire fringes has been described by taking the fast Fourier transform as an example, the present invention is not limited to this, is realizable also by using the discrete cosine transformation (DCT: Discrete Cosine Transform) etc., and can further reduce an amount of operation (calculation), too.

<Linear Grating Pattern>

Figure 24:
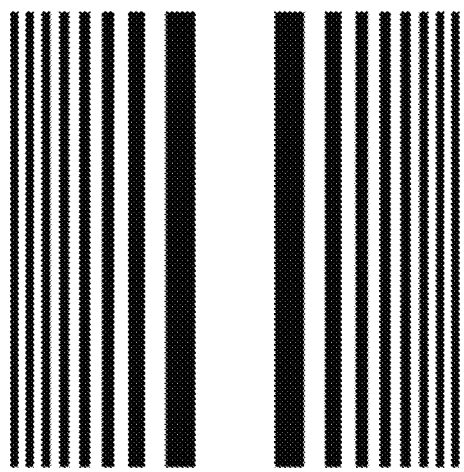
FIG. 24 is a view showing an example of a grating pattern.

The above description has been made by using the concentric grating pattern as the modulator. However, even if a linear grating pattern is used, photography and an image(s) can be generated based on the same concept as that of the curved grating pattern described above. FIG. 24 shows an example of a linear grating pattern. Similarly to a case of the curved grating pattern, FIG. 24 indicates that a width and an interval of the linear grating patter decrease (narrow) in inverse proportion as being distant from its center. Hereinafter, an imaging apparatus to be explained will be described about a case of the curved grating pattern, but a linear grating pattern may be also used.

<Noise Cancellation>

In the description so far, the discussion has been made by focusing on Expression (6) in which only components having the sharp peaks are extracted from Expression (5), but terms other than the fourth term in Expression (5) become noise actually. Therefore, noise cancellation based on fringe scan is effective.

First, if it is assumed in an interference-fringe intensity distribution of Expression (2) that an initial phase of the front-side grating pattern 104 is $\Phi F$ and an initial phase of the back-side grating pattern 105 is $\Phi B$, Expression (5) can be represented as follows.

$$I(x,y)I(x+\delta,y)=\tfrac{1}{4}\{1+\cos \beta[\beta(x^2+y^2)+\Phi_B]\}\{1+\cos[\beta((x+\delta)^2)+y^2)+\Phi_F]\} \quad \text{Expression (18)}$$

Here, if orthogonality of the trigonometric function is used to integrate Expression (18) with respect to ΦF and ΦB, the following is obtained and its noise term is canceled and a term(s) having a constant multiple of a single frequency remains.

$$\int\int_0^{2\pi} I(x, y)I(x+\delta, y)\cdot \qquad \text{Expression (19)}$$

$$\cos(\Phi_B - \Phi_F)d\Phi_B d\Phi_F = \frac{\pi^2}{4}\cos(2\beta\delta x + \beta\delta^2)$$

From the foregoing discussion, applying the Fourier transformation to this will result in sharp peaks in the spatial frequency distribution without noise.

Here, Expression (19) is shown in the form of integration, but the same effect as that obtained therefrom can be practically obtained by calculating the sum of combinations of ΦF and ΦB. Each of ΦF and ΦB may be set so as to equally divide angles between 0 and 2Π, and be equally divided into four such as {0, Π/2, Π, 3Π/2} and into three such as {0, Π/3, 2Π/3}.

Further, Expression (19) can be simplified. In Expression (19), ΦF and ΦB are calculated so as to be changeable independently. However, even if ΦF=ΦB, that is, if the same phase is applied to the initial phases of the front-side grating pattern 104 and the back-side grating pattern 105, the noise term can be canceled. If ΦF=ΦB=Φ is assumed in Expression (19), the following expression is obtained.

$$\int_0^{2\pi} I(x, y)I(x+\delta, y)d\Phi = \frac{\pi}{4}[2+\cos(2\beta\delta x + \beta\delta^2)] \qquad \text{Expression (20)}$$

From this expression, the noise term is canceled, and a term(s) having a constant multiple of a single frequency remains. Additionally, Φ may be set so as to equally divide angles between 0 and 2Π, and may be equally divided into four such as {0, Π/2, Π, 3Π/2}.

Additionally, even if the above phase is not equally divided, the noise term can be canceled also by using an orthogonal phase of {0, Π/2}, which can further simplify the noise term. First, if the back-side grating pattern 105 is implemented (performed) by the image processor 1902 similarly to the configuration of FIG. 19, Expression (18) is changed to the following (ΦF=ΦB=Φ) in order to handle a negative value of the back-side grating pattern 105.

$$I(x, y)I(x+\delta, y) = \qquad \text{Expression (21)}$$

$$\frac{1}{4}\cos[\beta(x^2+y^2)+\phi]\{1+\cos[\beta((x+\delta)^2+y^2)+\phi]\}$$

Since the back-side grating pattern 105 is known, the back-side grating pattern 105 is subtracted from Expression (21) and a case of Φ={0, Π/2} is added thereto. Consequently, as indicating by the followings, the noise term is canceled and a term(s) having a constant multiple of a single frequency remains.

$$[I(x, y)I(x+\delta, y) - \qquad \text{Expression (22)}$$

$$I(x, y)]|_{\phi=0} + [I(x, y)I(x+\delta, y) - I(x, y)]|_{\phi=\frac{\pi}{2}} =$$

$$\frac{1}{4}\cos(2\beta\delta x + \beta\delta^2)$$

Additionally, as described above, the front-side grating pattern 104 and the back-side grating pattern 105 are separated from two developed images that are generated in the spatial frequency space by being shifted by δ0 in advance. However, this method has a problem of reducing, by half, the number of pixels of the developed image. Therefore, a method of avoiding overlap of the developed images without shifting by δ0 will be described. In the fringe scan of Expression (19), an arithmetic operation is performed on a complex plane by using exp of the following instead of cos.

$$\int\int_0^{2\pi} I(x, y)I(x+\delta, y)\cdot \qquad \text{Expression (23)}$$

$$e^{i(\Phi_B-\Phi_F)}d\Phi_B d\Phi_F = \frac{\pi^2}{4}e^{i(2\beta\delta x - \beta\delta^2)}$$

As a result, the noise term is canceled, and a term(s) having a constant multiple of a single frequency remains. If exp (2iβδx) in Expression (23) is applied to the Fourier transform, the following expression is obtained.

$$\mathcal{F}[e^{i2\beta\delta x}]=\delta(u+2\delta\beta,v) \qquad \text{Expression (24)}$$

As can be seen from Expression (7), it is understood that two peaks are not generated and a single developed image is obtained. Thus, displacing (shifting) the front-side grating pattern 104 and the back-side grating pattern 105 also becomes unnecessary, and the number of pixels becomes usable effectively.

A configuration for performing the above-described noise canceling method based on the fringe scan will be described with reference to FIGS. 25 to 28. In the fringe scan, at least a plurality of patterns having different initial phases need to be used as the front-side grating pattern 104. To realize this, there are a method of switching the patterns by time division and a method of switching the patterns by space division.

Figure 25:
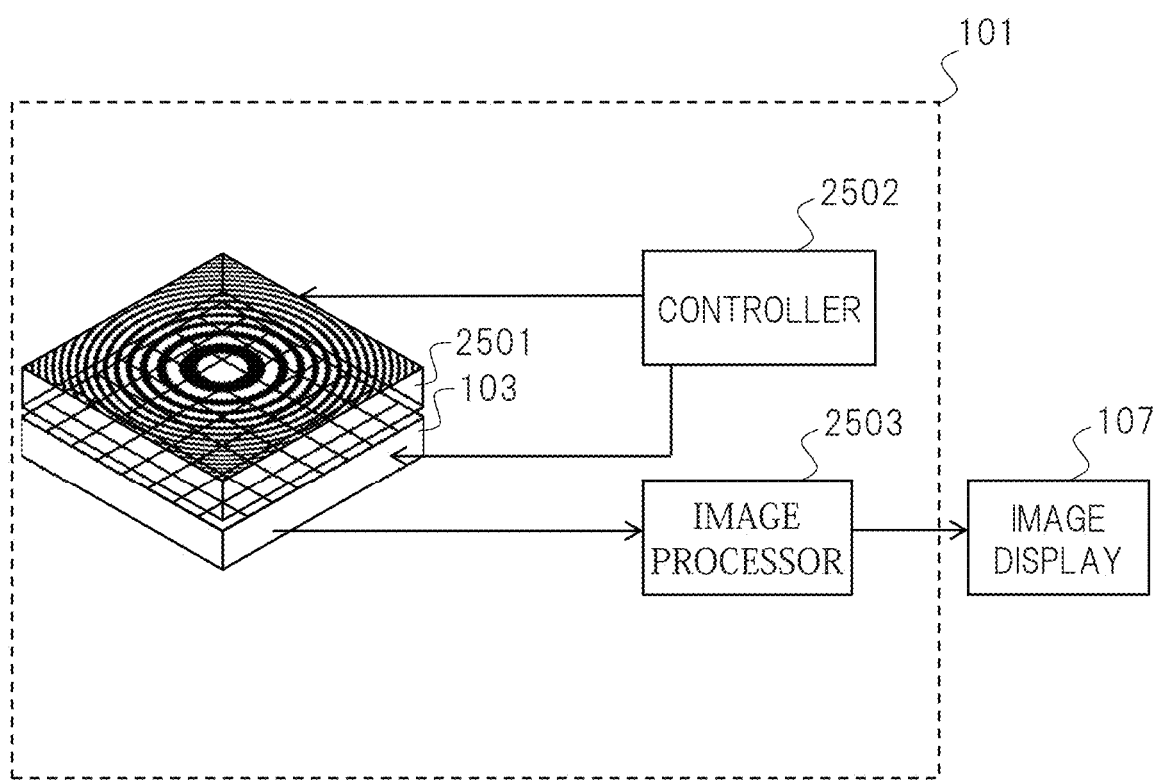
FIG. 25 is a view showing an example which realizes a time-division fringe scan.

FIG. 25 shows a configuration for realizing time-division fringe scan. A modulator 2501 is, for example, a liquid crystal display element etc. that can electrically switch and display (phase-shift) a plurality of initial phases shown in FIG. 25. Patterns of FIGS. 26(a) to 26(d) have initial phases ΦF or Φ of {0, Π/2, Π, 3Π/2}, respectively.

Figure 26:
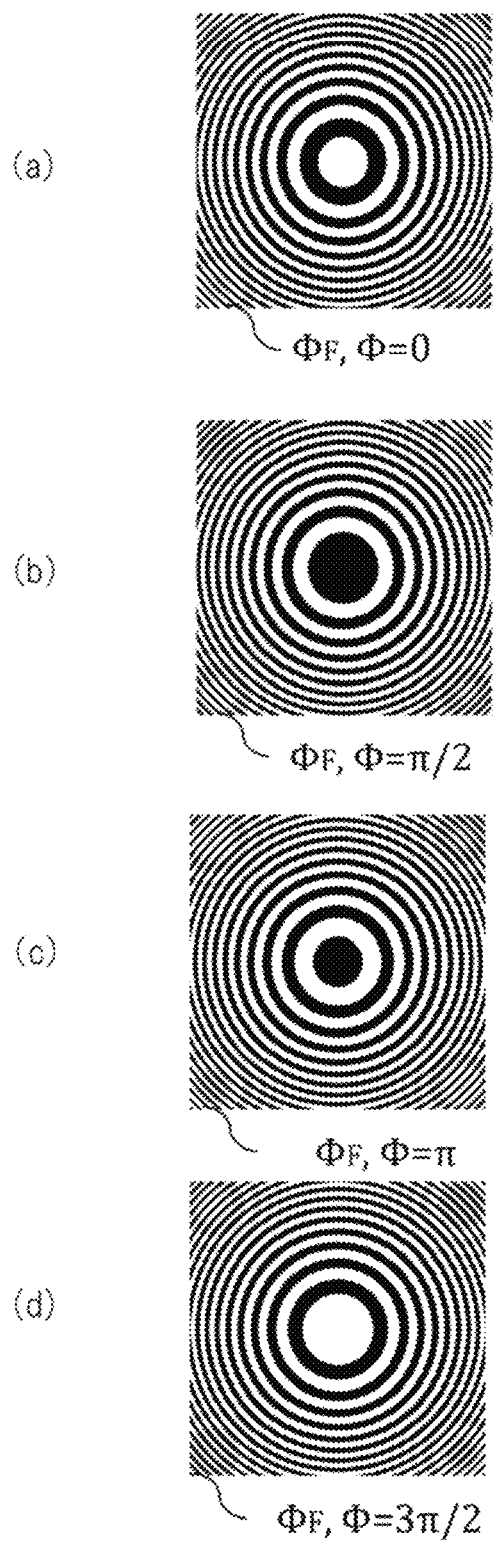
FIG. 26 is views each showing an example of a grating pattern in the time-division fringe scan.

As shown in FIG. 26, each of the patterns in FIGS. 26(a) to 26(d) is composed of a plurality of lines. The pattern in FIG. 26(a) corresponds to a first grating pattern, and the pattern in FIG. 26(c) corresponds to a second grating pattern whose phase is shifted by π from the first grating pattern. Additionally, the pattern of FIG. 26(b) corresponds to a third grating pattern whose phase is shifted by Π/2 from the first grating pattern, and the pattern of FIG. 26(d) corresponds to a fourth grating pattern whose phase is shifted by 3Π/2 from the first grating pattern.

Each of the grating patterns shown in FIG. 26 is composed of a plurality of concentric circles, and the concentric circles become finer in inverse proportion to a pitch between the concentric circles with respect to reference coordinates to be a center of the concentric circles.

Incidentally, the grating pattern of the modulator 2501 is composed of a plurality of straight lines as shown in FIG. 24, and the plurality of straight lines may be narrowed in inverse proportion to a distance between the straight lines with respect to the reference coordinates.

FIG. 27 shows examples of electrode arrangements in a liquid crystal display element of the modulator 2501 that realizes the grating patterns shown in FIG. 26. Concentric electrodes are formed so as to divide one period of the grating pattern into four parts. Every four electrodes are connected from the inside, and the four electrodes are drawn, as drive terminals, out from its outer circumferential portion. By temporally switching a voltage state applied to these four electrodes between two states of "0" and "1", the initial phase ΦF or Φ of the grating pattern is switchable to $\{0, \Pi/2, \Pi, 3\Pi/2\}$ as shown in FIGS. 27(a) to 27(d).

Incidentally, in FIG. 27, the shaded electrodes to which "1" is applied correspond to light shielding, and the white-colored electrodes to which "0" is applied correspond to light transmission.

Figure 28:
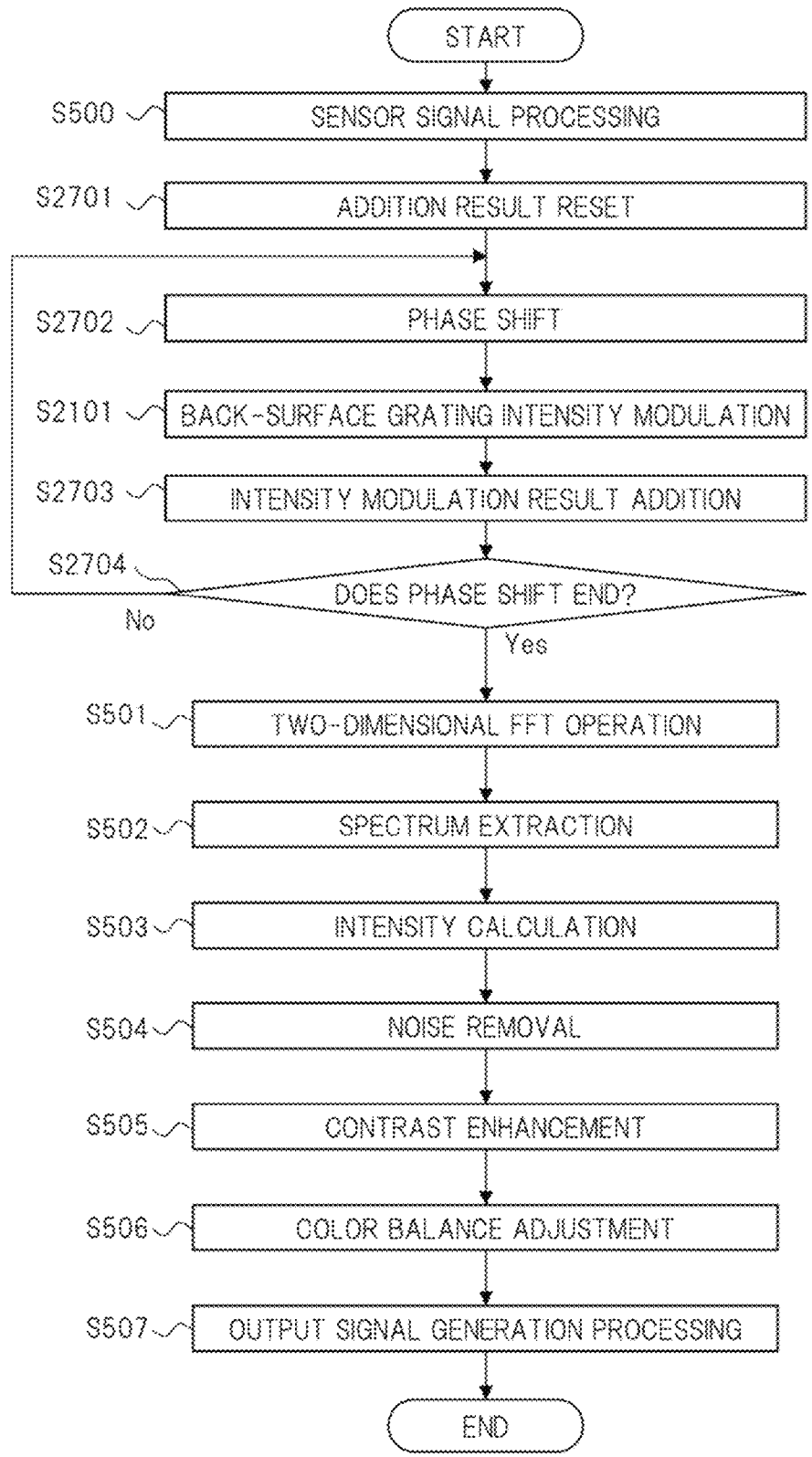
FIG. 28 is a diagram showing a processing flow of an image processor in an example that realizes the time-division fringe scan.

Next, FIG. 28 is a flowchart showing an outline of image processings in an image processor 2503. The flowchart of FIG. 28 differs from the flowchart of FIG. 21 in processings of steps S2701 to S2704. First, an image processor 2503 resets an addition result (s) at the beginning of a fringe scanning operation (S2701) Next, in a case of corresponding to Expression (20), the image processor 2503 sets it to the same initial phase as that of the front-side grating pattern 104 used for photography (S2702), generates the back-side grating pattern 105 having the initial phase, and multiplies the image of the image sensor 103 by it (S2101).

The image processor 2503 adds a multiplied result for each initial phase pattern (S2703). The above-mentioned processings of steps S2702 to S2703 are repeated by the number of all initial phase patterns (S2704). Subsequent processings are the same as the processings in FIG. 21, and so their descriptions will be omitted herein. Incidentally, the above flow has been described by using Expression (20) as an example, but the flow can be similarly applied also to Expressions (19), (22), and (23).

Figure 29:
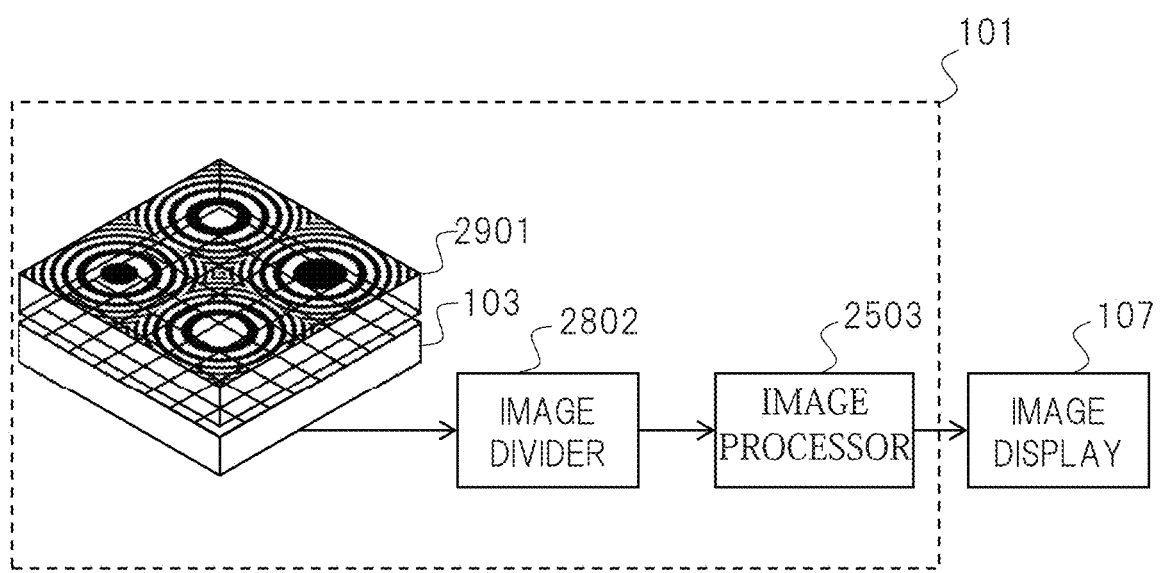
FIG. 29 is a view showing an example which realizes a space-division fringe scan.
Figure 30:
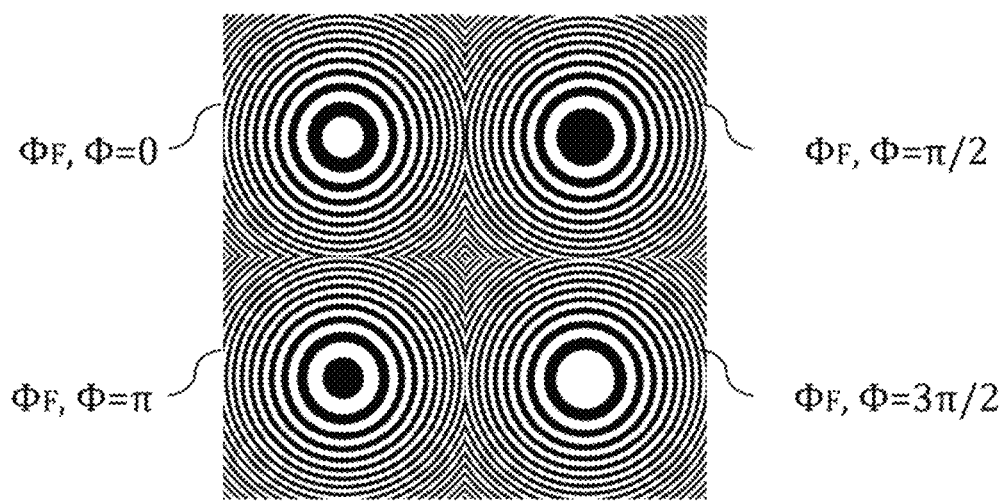
FIG. 30 is views each showing an example of a grading pattern in a space-division fringe scan.

In contrast, FIG. 29 shows a configuration for realizing a space-division fringe scan. A modulator 2901 has a configuration in which a plurality of initial phase patterns are two-dimensionally arranged, for example, so that the initial phase ΦF or Φ in FIG. 30 has each pattern of $\{0, \Pi/2, \Pi, 3\Pi/2\}$.

An image divider 2802 divides an output of the image sensor 103 into regions corresponding to a pattern arrangement of the modulator 2901, and sequentially transmits the divided regions to the image processor 2503. In an example of FIG. 30, the output of the image sensor is divided into 2-2 areas.

In the fringe scan based on Expression (20), the modulator 2801 is in a 2×2 pattern arrangement since requiring to have four phases. However, in the fringe scan based on Expression (22), the modulator 2901 is realizable in two phases, so that the modulator 2901 is realizable even in a 1×2 pattern arrangement. According thereto, the output of the image sensor is also divided into 1×2 areas. The subsequent processings of the image processor 2503 are the same as the processings in FIG. 28 which is a time-division fringe scan, so that their processings will be omitted.

Using this space-division fringe scan makes it unnecessary to perform electrical switching similarly to the modulator 2501 performing the time-division fringe scan, and it possible to manufacture the modulator at low cost. However, when the space-division fringe scan is used, resolution for dividing the image is effectively reduced. Therefore, if the resolution needs increasing, the time-division fringe scan is suitable.

<Storing of Compressed Image>

Figure 31:
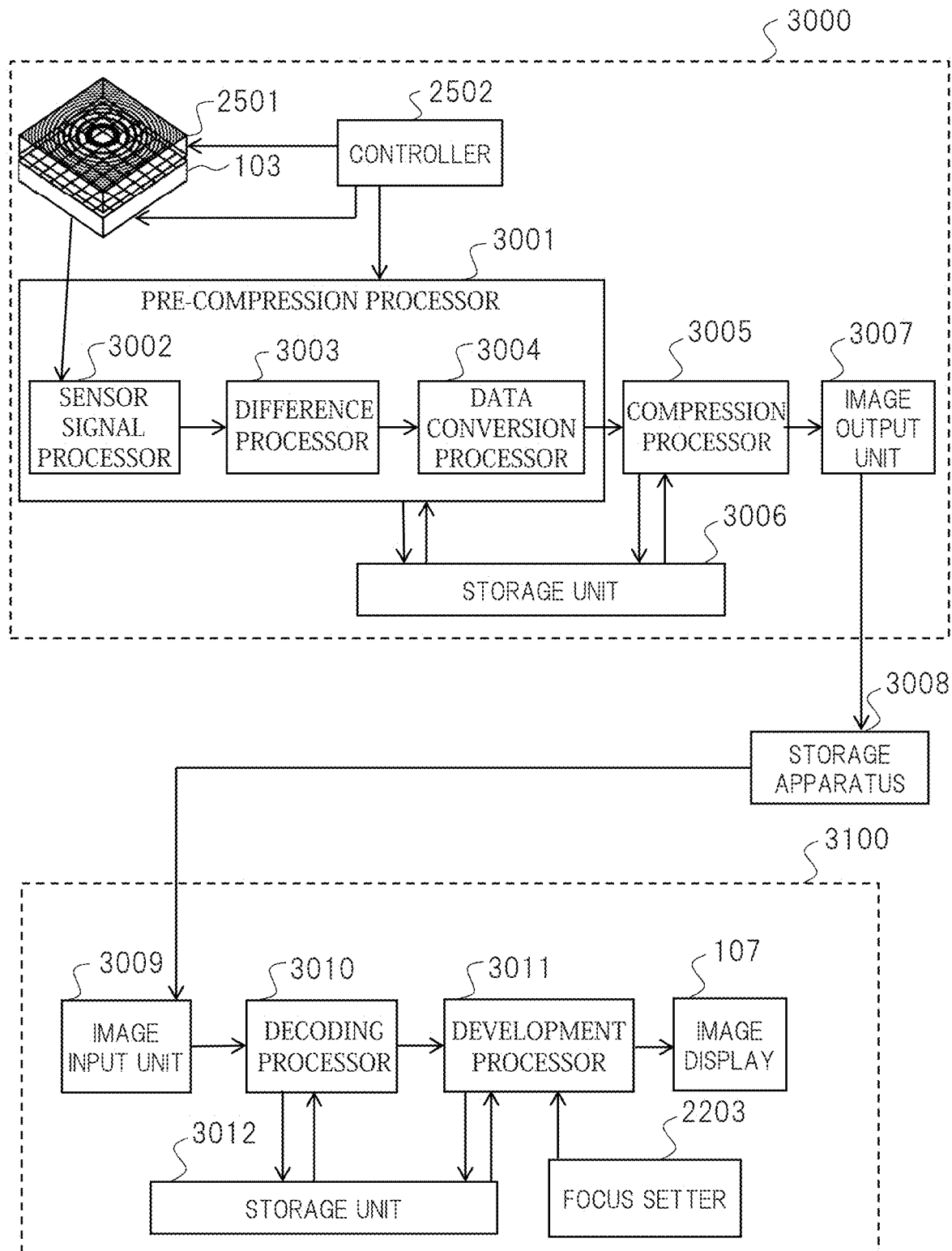
FIG. 31 is a view showing an example which compresses difference image data.

FIG. 31 shows a configuration example of an imaging system by reducing an information capacity (amount) of images whose focus adjustment has been performed after the photography and by diving the processings of the image processor 2503 in FIG. 25, the imaging system including an imaging apparatus 3000 and a playback apparatus 3100 that reduces a processing load(s) of the imaging apparatus. The same components as those in FIG. 25 are denoted by the same reference numerals, and their descriptions will be omitted. This imaging system includes an imaging apparatus 3000 and a playback apparatus 3100 (restoring apparatus). Incidentally, the time-division fringe scan is applied to this imaging system.

The imaging apparatus 3000 is an apparatus that compresses a result(s) of capturing (forming) an image(s). Additionally, the playback apparatus 3100 is an apparatus that restores (decompresses) the above compressed result and plays back (reproduces, restores) the decompressed result.

The imaging apparatus 3000 includes an image sensor 103, a modulator 2501, a controller 2502, a pre-compression processor 3001, a compression processor 3005 (compressing unit), a storage unit 3006, and an image output unit 3007. The pre-compression processor 3001 includes a sensor signal processor 3002, a difference processor 3003, and a data conversion processor 3004 (data conversion unit).

The playback apparatus 3100 includes an image inputter 3009, a decoding processor 3010, a development processor 3011 (image restoration processor, modulation processor), a storage unit 3012, a focus setter 2203, and an image display 107. Additionally, the imaging system further includes a storage apparatus 3008.

The controller 2502 controls the image sensor 103, the modulator 2501, and the pre-compression processor 3001, etc. as a whole.

As described above, the modulator 2501 is, for example, a liquid crystal display element capable of electrically switching and displaying a plurality of initial phases.

The sensor signal processor 3002 generates, for example, complementary data from data (image signal) of each pixel outputted from the image sensor 103, performs a demosaicing processing etc. to generate RGB data corresponding to each pixel, and outputs it as a sensor image(s). The sensor image stores the image data in the storage unit 3006 or sends it to the difference processor 3003 as necessary. Thus, the sensor signal processor 3002 receives the image signal outputted from the image sensor 103.

For example, the sensor signal processor 3002 receives an image signal (first image signal) when the modulator 2501 has a first grating pattern(s), or receives an image signal (second image signal) when it has a second grating pattern(s). Additionally, the sensor signal processor 3002 receives an image signal (third image signal) at a time of a third grating pattern(s), or receives an image signal (fourth image signal) at a time of a fourth grating pattern(s).

The difference processor 3003 obtains a difference between two sensor images (image signals) that have been photographed (captured) by changing a phase of the modulator 2501, and generates a difference image (difference data). The difference processor 3003 acquires a sensor image directly from the sensor signal processor 3002, or acquires a sensor image stored in the storage unit 3006. The difference processor 3003 stores the difference image in the storage unit 3006 as necessary. Incidentally, if the sensor image is, for example, a color image and one pixel is composed of R data, G data, and B data, a difference may be obtained for each of the R data, G data, and B data. Thus, the difference processor 3003 calculates the difference between the image signals received by the sensor signal processor 3002, and generates a difference image based on the difference.

For example, the difference processor 3003 calculates a difference between the first image signal and the second image signal, and generates a difference image (first difference data) based on the difference. Additionally, the difference processor 3003 calculates a difference between the third image signal and the fourth image signal, and generates a difference image (second difference data) based on the difference.

Figure 32:
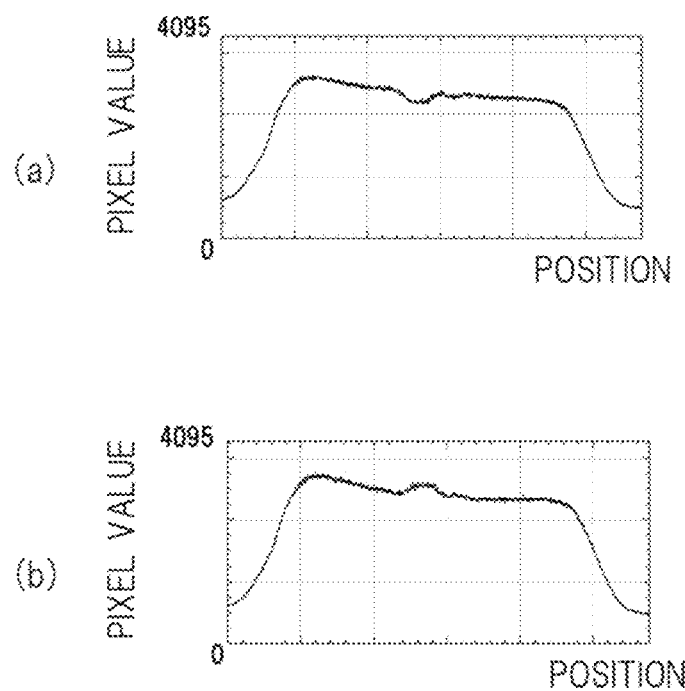
FIG. 32 is views each showing an inputted pixel-data example of an inter-frame difference processing in the example which compresses the difference image data.

Here, characteristics of inputted/outputted signals of the difference processor 3003 will be described in a case of the present imaging apparatus. FIG. 32 is a graph showing an example of a change in brightness of a part of a sensor image(s) outputted from the sensor signal processor 3002 in FIG. 31. A horizontal axis indicates a horizontal position of a certain line on a screen, and a vertical axis indicates a value of pixel data. Here, the graph indicates that as values of the pixel data are larger, the line on the screen is brighter. Incidentally, FIG. 32 shows an example of a case where the pixel data is represented by 12 bits, but the values of the pixel data may be represented by another number of bits or a normalized data value(s).

FIG. 32(*a*) shows one example of a change in pixel data in a case of applying the pattern of FIG. 26(*a*) to the modulator 2501 of FIG. 31, and FIG. 32(*b*) shows one example of a change in pixel data in a case of applying the pattern of FIG. 26(*c*) to the modulator 2501 of FIG. 31. Unlike the sensor image obtained by using a lens, the sensor image photographed (captured) by the present imaging apparatus is displayed through an integrated value(s) of a light amount(s), so that when the image sensor ideally captures a subject, no rapid change in data occurs.

Figure 33:
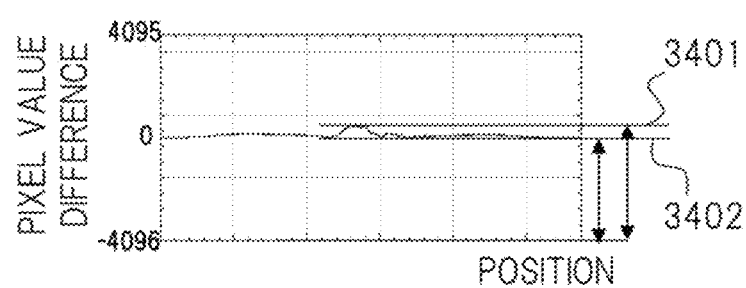
FIG. 33 is a view showing an outputted pixel-data example of an inter-frame difference processing in the example which compresses the difference image data.

However, for example, a DC (direct current) component(s) of the data may greatly change due to, for example, a shadow(s) of a casing etc. or characteristics in the image sensor. In order to eliminate these effects, obtaining a difference between sensor images having a phase difference of n of the modulator 2501 makes it possible to extract (fetch) only a necessary data portion of the sensor image. FIG. 33 is a graph showing an example of a change in brightness of a part of the difference image outputted from the difference processor 3003.

A vertical axis indicates a difference value, and a horizontal axis indicates a position of each pixel. As shown in FIG. 33, a difference between the pixel values at each position is shown. The value at the position with the largest difference is the maximum value 3401, and the value at the position with the smallest difference is the minimum value 3402. An example in FIG. 33 shows data at the same position as that of a video image in FIG. 32. The effect of being darkened by the shadow is eliminated, and only information necessary for later making a video image(s) by the playback apparatus 3100 remains.

Referring back to FIG. 31, the data conversion processor 3004 obtains the minimum value and the maximum value of pixel-data difference values from the entire difference image obtained by the difference processor 3003. By subtracting the minimum value as an offset value from each pixel-data difference value, the number of bits required to represent the difference image becomes the number of bits required to represent data obtained by subtracting the minimum value from the maximum value, thereby being greatly reducible from the number of bits representing the original pixel value.

Incidentally, when the number of bits per pixel of an inputted image is previously determined in the subsequent compression processor 3005, the data conversion processor 3004 performs a processing for allotting etc. the offset-subtracted difference image to, for example, 8 bits in consideration of compression efficiency and generates compression image data. Additionally, when not expression of red, green, and blue data but expression of luminance and color is demanded as the inputted image, the subsequent compression processor 3005 makes a conversion of the expression together with the above generation.

Thus, the data conversion processor 3004 generates compression image data (first compression image data) based on a difference range (between maximum value and minimum value) of the image signals by the difference processor 3003 and on the difference data. Incidentally, the data conversion processor 3004 has been described about the case of calculating the maximum value and the minimum value, but may calculate other information indicating the range of the difference.

The data conversion processor 3004 sends the generated compression image data to the compression processor 3005. Additionally, when the difference processor 3003 calculates a difference between the third image signal and the fourth image signal and generates a difference image (second difference data) based on the difference, the data conversion processor 3004 generates a compression image (second compression image data) based on the difference.

The compression processor 3005 performs a compression processing to reduce data amounts of: a still image(s) and a moving image(s); and audio when an audio input(s) is further contained therein although not shown. A compression encoding method is, for example, JPEG, JPEG 2000, MPEG 2, H.264/AVC, and H.265/HEVC, etc. The compression processor 3005 acquires a compression image from the data conversion processor 3004, compresses the compression image, and generates compressed data containing the data that has been compressed. A compressed data configuration by the compression processor 3005 contains, for example, a header, compressed image data, and a footer in JPEG.

Figure 34:
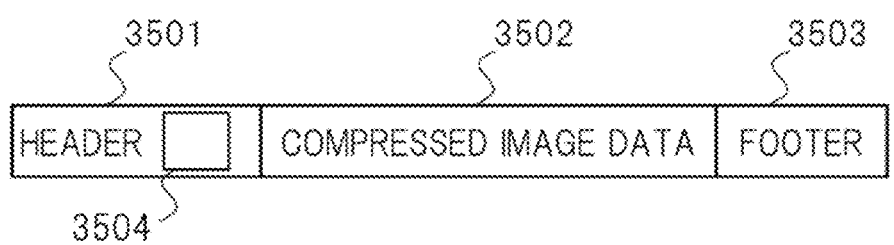
FIG. 34 is a view showing an image information example added to a compressed file in the example which compresses the difference image data.

FIG. 34 shows a configuration example of compressed data of one compressed image. As shown in FIG. 34, the compressed data has a header section 3501, compressed image data 3502, and a footer section 3503. The header section 3501 stores such information necessary for image compression/decoding as a starting marker, a file size, an image size, and a quantization table.

Referring back to FIG. 31, the compressed image data 3502 is data obtained by compressing a compression image(s). The footer section 3503 is a section in which an ending marker etc. are stored. Incidentally, the header section 3501 includes an area 3504 in which data can be freely set for each application in the header. The compression processor 3005 adds metadata to the area 3504. Here, FIG. 35 shows an example of metadata added to the compression processor 3005.

Figure 35:
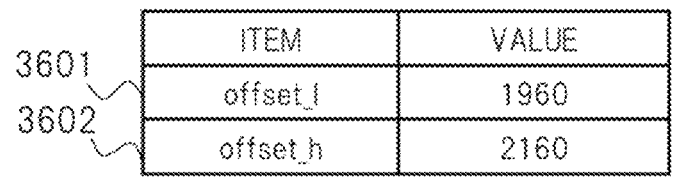
FIG. 35 is a view showing a format example of a compressed file in the example which compresses the difference image data.

As shown in FIG. 35, the metadata contains a record 3601 and a record 3602. The record 3601 contains a variable and a value of the minimum value of the pixel data of the difference image obtained by the data conversion processor 3004. The record 3602 contains a variable and a value of the maximum value of the pixel data of the difference image.

The compression processor 3005 generates a compressed image(s) and a compressed parameter(s) at a time of the image compression and adds, as metadata, the information shown in FIG. 35, thereby enabling image restoration in the subsequent image playback apparatus 3100. Thus, the compression processor 3005 contains, in the compressed image, information (variable and value of the minimum value, variable and value of the maximum value) indicating the range of the difference.

Incidentally, the metadata has only to be added when the image is outputted from the imaging apparatus 3000, so that the image output unit 3007 may newly add the metadata to the header to which the metadata has been already added.

When the difference processor 3003 calculates a difference between the third image signal and the fourth image signal and generates a difference image based on the difference, the compression processor 3005 contains, in the compressed image in which the second compression image data is compressed, information (variable and value of the minimum value, variable and value in the maximum value) indicating a range of the difference between the third image signal and the fourth image signal.

The image output unit 3007 is a unit that outputs the compressed data generated by the compression processor 3005. The image output unit 3007 stores and outputs the compressed data in and from the storage apparatus 3008.

The storage unit 3006 and the storage unit 3012 are used by the pre-compression processor 3001, compression processor 3005, decoding processor 3010, and development processor 3011 for temporarily storing parameters and storing image data.

The image output unit 3007 records, in the storage apparatus 3008, a compressed file (s) generated by the compression processor 3005.

The storage apparatus 3008 is such an apparatus for recording digital data as a hard disk (HDD), a solid state drive (SSD), a memory card, and a recorder using them.

The image input unit 3009 extracts the compressed data, which has been stored in the storage apparatus 3008, sequentially or in response to a request from a user although not shown. Consequently, the image input unit 3009 inputs the data outputted from the image output unit 3007. The image input unit 3009 sends the inputted data to the decoding processor 3010.

The decoding processor 3010 performs a decoding processing that utilizes a method used in a compression method of the compression processor 3005, and decodes the compressed image data 3502 from the information stored in the header section 3501 of FIG. 34, thereby acquiring a decoded image (compressed and uncompressed image). Additionally, the decoding processor 3010 simultaneously acquires the added metadata, and sends it to the development processor 3011.

The development processor 3011 generates a restored difference image by restoring an image (difference data) that has an offset and original bit depth from the decoded image and the metadata. That is, the development processor 3011 generates a restored difference image from the decoded image and a range of the difference.

The development processor 3011 further performs, for focus adjustment, the back-surface pitch determination (S2301) and the back-surface grating intensity modulation (S2101) that have been described with reference to FIG. 23, and performs the intensity modulation result addition (S2703) that has been described with reference to FIG. 28. Furthermore, the processings of the two-dimensional FFT operation (S501), spectrum extraction (S502), intensity calculation (S503), noise removal (S504), contrast enhancement (S505), color balance adjustment (S506), output signal generating processing, which have been described with reference to FIG. 25, are each performed sequentially, and the image display 107 generates a display signal capable of displaying the developed image.

That is, the development processor 3011 modulates a restored difference image to generate a moire-fringe image, and calculates a frequency spectrum by Fourier-transforming the moire-fringe image.

The imaging apparatus having the above-described configuration makes it possible to reduce the data amount (capacity) of images capable of the focus adjustment etc. from later, thereby also leading to a reduction in costs of the storage apparatus. Additionally, by performing the development processing in the playback apparatus, the processing of the storage apparatus is reduced, and a size and costs of the storage apparatus can be reduced. Incidentally, as long as the configuration as illustrated can be realized, the playback apparatus may use a personal computer etc. to be realized by a software processing, or may be performed by a hardware processing such as a GPU or FPGA. Further, the storage apparatus may be an HDD etc. built in the playback apparatus.

Figure 36:
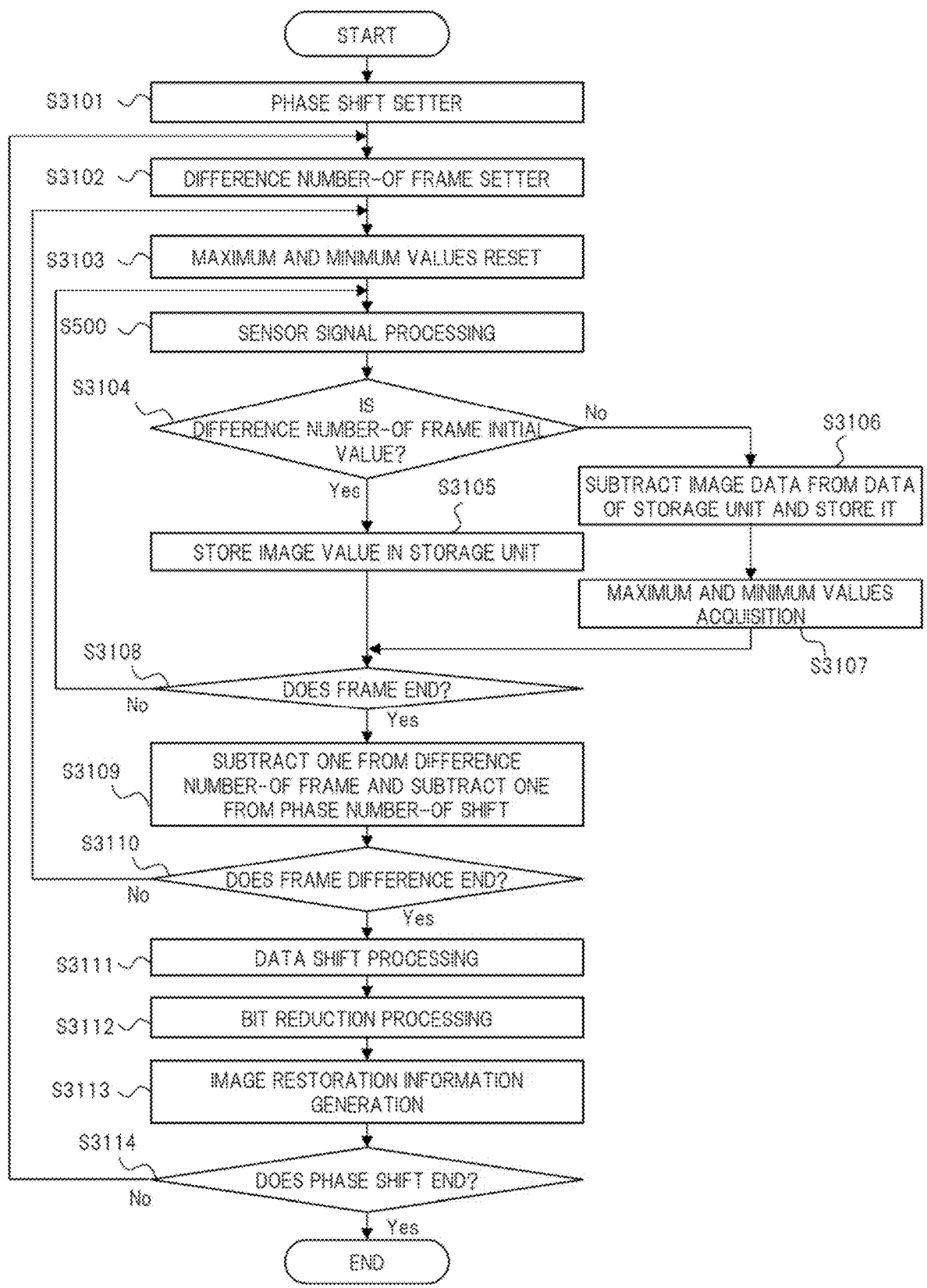
FIG. 36 is a diagram showing a processing flow of a pre-compression processor in the example which compresses the difference image data.

FIG. 36 is a flowchart showing an outline of an image processing in the pre-compression processor 3001. First, the pre-compression processor 3001 sets the number of phase shifts of the grating pattern (zone plate) of the modulator 2501 (S3101) The pre-compression processor 3001 sets "4", for example, when four patterns are time-divided. Incidentally, this may be set in advance in the pre-compression processor 3001.

Subsequently, the pre-compression processor 3001 sets the number of frames from which a difference between the image data is obtained (S3102). Additionally, the pre-compression processor 3001 resets the maximum value and the minimum value, for example, resets them to 0 (S3103).

The pre-compression processor 3001 executes a sensor signal processing (3500), and stores pixel data into the storage unit 3006 (S3105) when determining that a difference frame is an initial value (S3104: Yes). Until an end of the frame is determined in step 33108, the sensor signal processings 3500 is repeated.

When it is determined in step S3104 that the frame is not the initial frame, a pixel value having the same coordinates stored in step 33105 is subtracted and stored into the storage unit 3006 in step S3106. Additionally, in step 33107, the maximum value and the minimum value are compared with the pixel value, and if being larger than the maximum value, the pixel value is set to the maximum value or if being smaller than the minimum value, the pixel value is set to the minimum value. Next, the end of the frame is determined in step 33018. If the determination indicates no end of the frame, the sensor signal processing is performed (executed) (S500), or if the determination indicates the end of the frame, the processing is ended.

In step S3109, 1 is subtracted from the number of frames and the phase shift which obtain the difference. When it is determined in S3110 that the frame difference is not ended, S3110 returns the processing of resetting the maximum value and the minimum value of S3103. When it is determined that the frame difference is ended, the data shift processing of step S3111 is performed.

In step S3111, the data shift processing is performed to set the minimum value out of the difference image value to 0 by, for example, subtracting the minimum value from all the difference pixel values based on the minimum value acquired in step S3107. Step S3112 performs, for example, a bit reduction processing of reducing unused higher-order bits based on the maximum value acquired in step S3107.

Incidentally, in a case etc. where the number of bits of the image data is limited by an algorithm used for image compression, the bit reduction processing (S3112) performs a processing of re-allocating them to the number of bits to be a target. In step S3113, the difference pixel value converted in the data shift processing (S3111) or the bit reduction processing (33112) is generated as image restoration information so as to be capable of being restored in the development processing performed later, for example, information on the maximum value and/or the minimum value is generated as metadata.

Next, step S3114 determines whether the phase shift is ended. If all the phase processings have been completed, the processing ends. If not, the processings from step 33102 are repeated.

The above-mentioned pre-compression processing makes it possible to reduce the number of bits of the pixel value of the sensor image, and to efficiently perform the compression processing.

Figure 37:
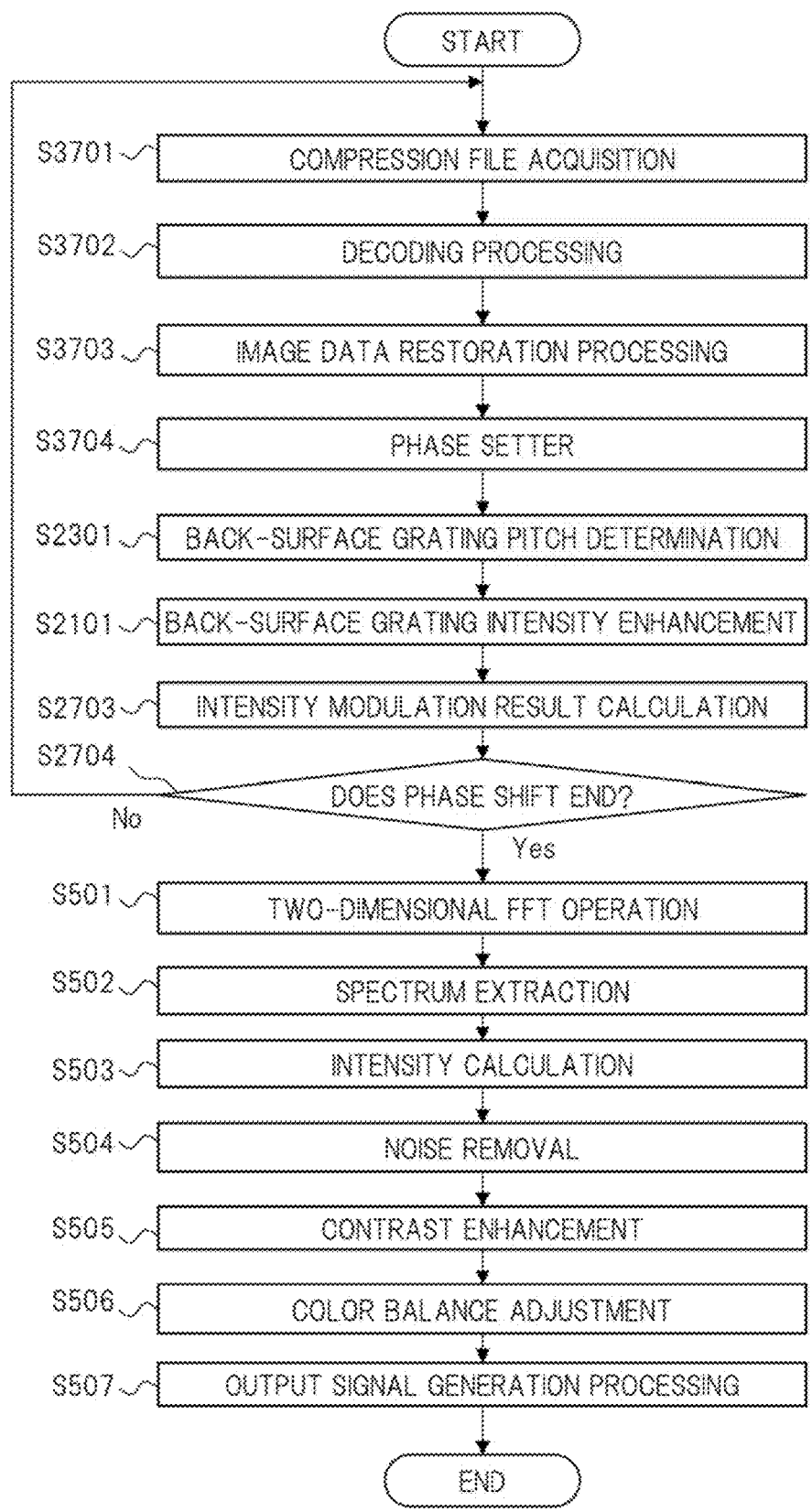
FIG. 37 is a diagram showing a processing flow of an image playback section in an example which compresses a difference image-data capacity.

Subsequently, a processing procedure of the playback apparatus 3100 shown in FIG. 31 will be described with reference to FIG. 37. The same processings as those in FIGS. 5, 21, 23, and 28 are denoted by the same reference numerals, and their descriptions will be omitted. When a processing starts, a compressed file is acquired from the storage unit 3012 in step S3701. Next, in step S3702, the header information of the compressed file is used to perform the decoding processing of the compressed image. Next, in step S3703, image information that is the maximum value and the minimum value of the pixel data of the original image is obtained from the metadata in the header of the compressed file, and a pixel data restoration processing is performed for restoring the image data of the difference image prior to being performed by the data conversion processor 3004 in FIG. 31.

Here, if the algorithm used for compression is irreversible compression, the restored image may not be exactly the same as the pre-restored image. Next, in step S3704, a phase of the modulator is set. The phase may be set so that, for example, a first set value of the phase is 0 and the next set value is shifted by Π.

Thereafter, the back-surface pitch determination (S2301) and back-surface grating intensity modulation (S2101) described with reference to FIG. 23 are performed, and the intensity modulation result addition (S2703) described with reference to FIG. 28 is performed. Here, step S2704 determines whether the phase shift is ended. For example, if a processing of a phase shift of n has not been completed, step S2704 returns to the compressed file acquisition (S3701). If the phase shift has been completed, the two-dimensional FFT operation (S501), spectrum extraction (3502), intensity calculation (3503), noise removal (S504), contrast enhancement (S505), and color balance adjustment (3506), and output signal generation processing (3507) that have been described with reference to FIG. 5 are sequentially performed, respectively, and the image display 107 generates a display signal capable of displaying the developed image.

The above-mentioned playback apparatus performs the decoding processing of the compressed image and restores the focus-adjustable image, so that the playback apparatus can perform the focus adjustment and distance measurement of a subject necessary to the user when the user needs the subject.

Second Embodiment

Figure 38:
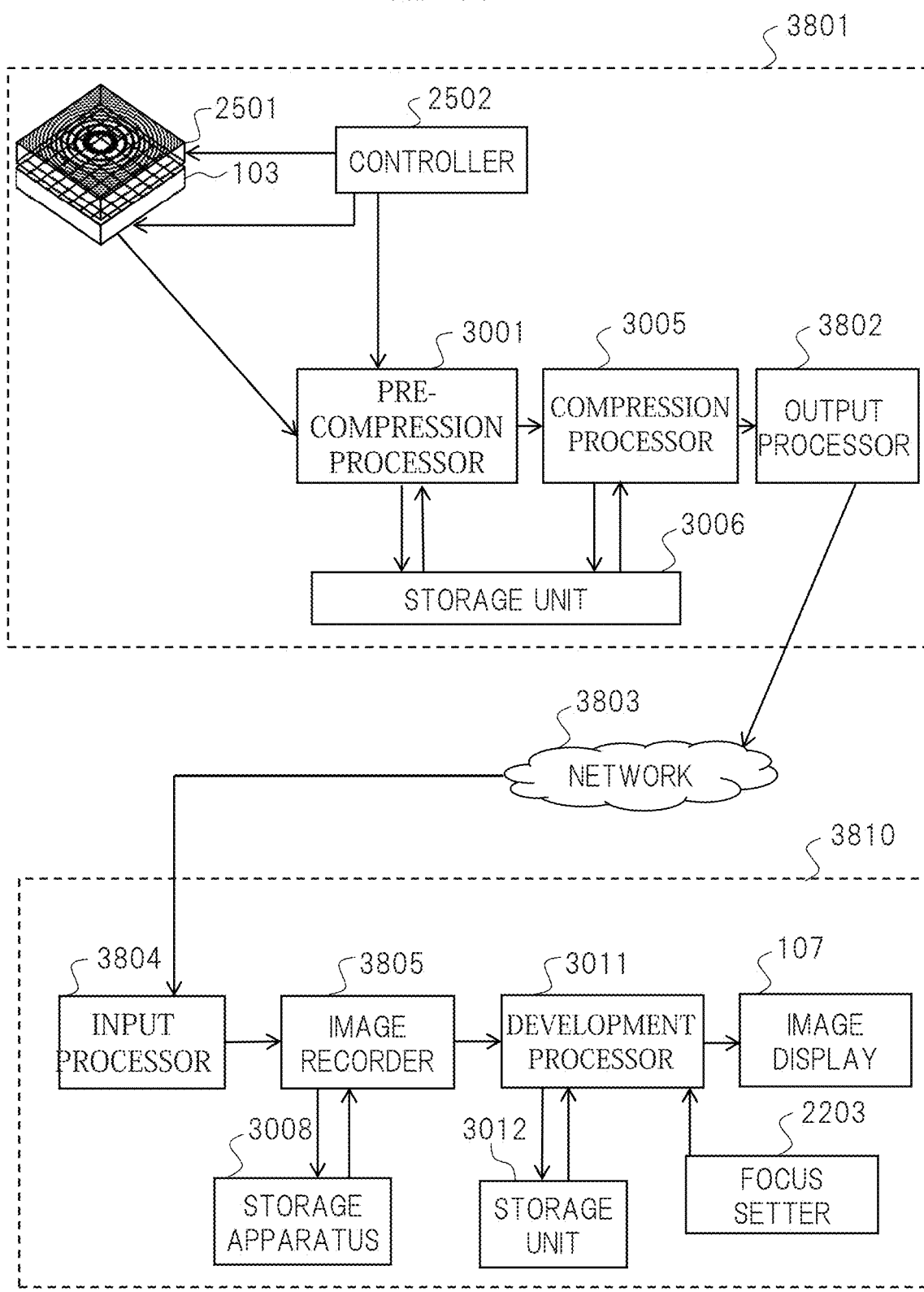
FIG. 38 is a view showing an example which transmits difference compressed image data over the network.

FIG. 38 shows a configuration of an imaging system that applies a fringe scanning method, compresses imaged image data, and transmits the compressed image data. The same components as those in FIG. 31 are denoted by the same reference numerals, and their descriptions will be omitted. This imaging system includes an imaging apparatus 3801 and a development processing apparatus 3810. The imaging apparatus 3801 and the development processing apparatus 3810 are connected by a network 3803.

The imaging apparatus 3801 includes: a modulator 2501 containing the image sensor 103; a controller 2502; a pre-compression processor 3001; a compression processor 3005; an output processor 3802 (output unit); and a storage unit 3006. Additionally, the development processing apparatus 3810 has an input processor 3804, an image recorder 3805, a storage apparatus 3008, a decoding processor 3010, a development processor 3011, a storage unit 3012, a focus setter 2203, and an image display 107.

The output processor 3802 converts, into a format for transmission to the network, the compressed image data and metadata outputted from the compression processor 3005 and performs a communication processing to them. That is, the output processor 3802 transmits and outputs the data compressed by the compression processor 3005 via the network 3803.

As a communication interface of the output processor 3802, a method such as a wired LAN (Local Area Network) or a not-shown wireless LAN such as Wi-Fi (registered trademark) may be used. A third generation mobile communication system (hereinafter, abbreviated as "3G") such as a GSM (registered trademark) (Global System for Mobile Communications) system, a W-CDMA (Wideband Code Division Multiple Access) system, a CDMA2000 system, or a UMTS (Universal Mobile Communications System), which is a mobile communication system, or a mobile communication network such as a LTE (Long Term Evolution) system may be utilized to be connected to a communication network through a base station.

Additionally, the imaging apparatus 3801 may mount a chip(s) communicable with a plurality of different systems, thereby being used properly according to an environment for its use.

The input processor 3804 of the development processing apparatus 3810 has the same communication interface as that of the output processor 3802 of the imaging apparatus 3801. Incidentally, the communication interface of the input processor 3804 does not need to be exactly the same as that of the output processor 3802, and has only to have at least one or more than communication interfaces. The input processor 3804 outputs data, which is received via the network 3803, to the image recorder 3805 as image data or accompanying metadata. The image recorder 3805 stores the acquired image data and accompanying metadata into the storage apparatus 3008. Processings sequent to this processing are the same as those in FIG. 31, so that their descriptions will be omitted.

As described above, network-transmitting the video image before the development processing makes it possible to simplify the configuration of the imaging apparatus 3801 and to provide a small, lightweight, and low-cost imaging apparatus. Additionally, transmitting the image after the fringe scanning makes it possible to perform the focus adjustment and distance measurement in the development processor and, when the user want to check the image after the photography, for the user to focus on an area where the user wants to see or for the user to measure its distance.

Third Embodiment

Next, when the maximum value and the minimum value of the difference image partially increase due to light-beam incident-angle characteristics of an image sensor and a strong light source(s), a block dividing method capable of preventing image quality from deteriorating will be described.

In the present embodiment, the data conversion processor 3004 divides, for each block, the difference image generated by the difference processor 3003 and obtains, for each block, the minimum and maximum values of difference values among the divided blocks. By setting the minimum value as an offset value, it is subtracted from a pixel-data difference value of the block.

Figure 39:
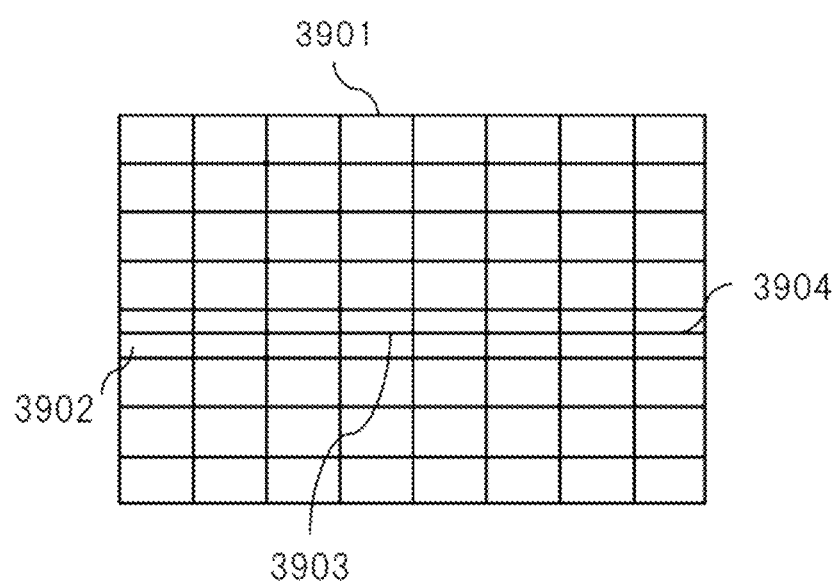
FIG. 39 is a view showing an example which divides the difference image data into blocks.

FIG. 39 shows an example of screen division made when the pre-compression processor 3001 divides the image into blocks. An image 3901 shows an image of one frame. The image 3901 is divided into eight in horizontal and vertical directions to generate blocks 3902, 3903. A horizon-directional line of the image 3901 is referred to as a horizontal line 3904.

Figure 40:
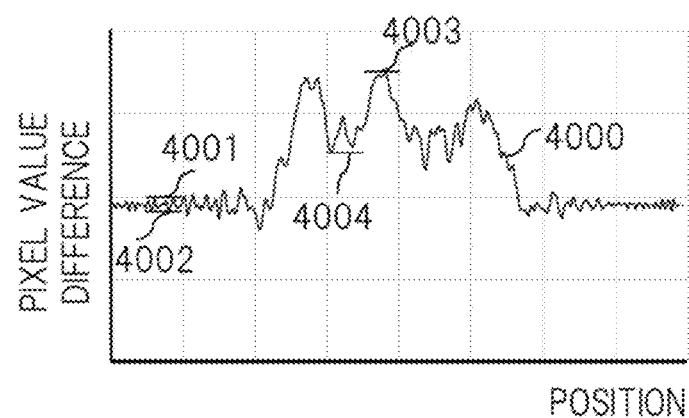
FIG. 40 is a view showing an outputted pixel-data example of an inter-frame difference processing in the example which compresses the difference image data.

FIG. 40 shows an example of image data on a difference image of the horizontal line 3904. A vertical axis indicates a difference between the pixel values, and a horizontal axis indicates a position. A graph 4000 shows a change in image data in the horizontal line 3904. The pre-compression processor 3001 calculates a difference value between images in block units. Based on this result, the pre-compression processor 3001 calculates the maximum value 4001 of the block 3902 and the minimum value 4902 of the block 3902. Additionally, the pre-compression processor 3001 calculates the maximum value 4003 of the block 3903 and the minimum value 4004 of the block 3903.

As shown in FIG. 40, the pixel data of the difference image has, due to characteristics etc. of the image sensor 103, an area where the pixel data is large and an area where the pixel data is small. A width and an absolute value of a change in pixel data from the minimum value 4002 to the maximum value 4001 in block 3902 are greatly different from those of a change in pixel data from the minimum value 4004 to the maximum value 4003 in block 3903. Therefore, if the image data is converted into the same offset and the same number of bits, the converted image data brings deterioration in image quality.

Figure 42:
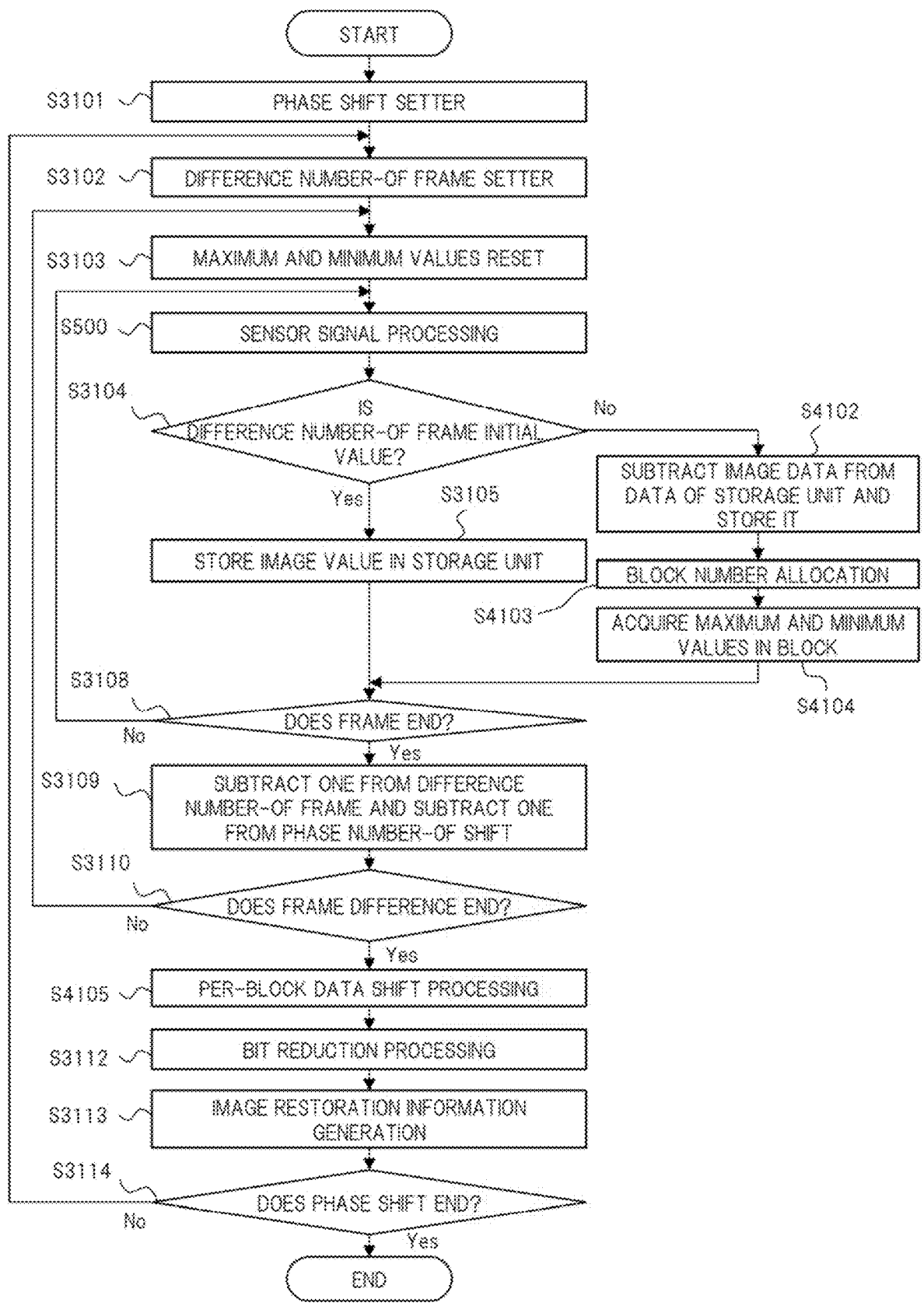
FIG. 42 is a diagram showing a processing flow of a pre-compression processor in an example which divides, into blocks, the image data after fringe scan.

In contrast, the processing for each block makes it possible to be converted into an image suitable for compression and to be sent. FIG. 41 shows an example of metadata when the screen is divided as shown in FIG. 39. The metadata includes the number of horizontal blocks, the number of vertical blocks, and the minimum value and the maximum value as an offset of each block and is transmitted, as metadata added to the compressed image, to the development processing apparatus together with the compressed image. FIG. 42 shows a processing flow when the pre-compression processing is divided into blocks and performed, and its operation will be described. The same components as those in FIG. 36 are denoted by the same reference numerals, and their descriptions will be omitted.

If the imaging apparatus 3801 determines in step S3104 that the frame is a first frame, the imaging apparatus 3801 stores pixel data into the storage unit 3006 in step S4101 and repeats the processing until it is determined in step S3108 that the frame has ended. In step S3104, in a case of an image of a second frame, that is, an image whose phase is shifted by n from the first frame (S3104: No), the pixel data is subtracted from the storage unit 3006 and stored in step S4102. Next, in step S4103, a block number is allocated from a position of the pixel data. If the block number is larger than the maximum value in the allocated block, it is held as the maximum value. If the block number is smaller than the minimum value, it is held as the minimum value (S4104).

If it is determined in step S3108 that a difference acquisition processing in the frame and the acquisition of the maximum value and the minimum value in the block have been completed (S3108: Yes), a data shift processing for each block in step S4105 and a bit reduction processing (S3112) are performed. Further, performed in step S3113 is an image restoration information generation processing for generating, for each block, data on the maximum value and the minimum value to be set in the header of the compressed data.

As described above, the pixel data of the difference image is divided into blocks and performed when being greatly different depending on a screen position, and the number of bits of the pixel data is reduced when a lossy compression is used for the compression processing. Those makes it possible to reduce the deterioration in image quality.

Fourth Embodiment

Figure 43:
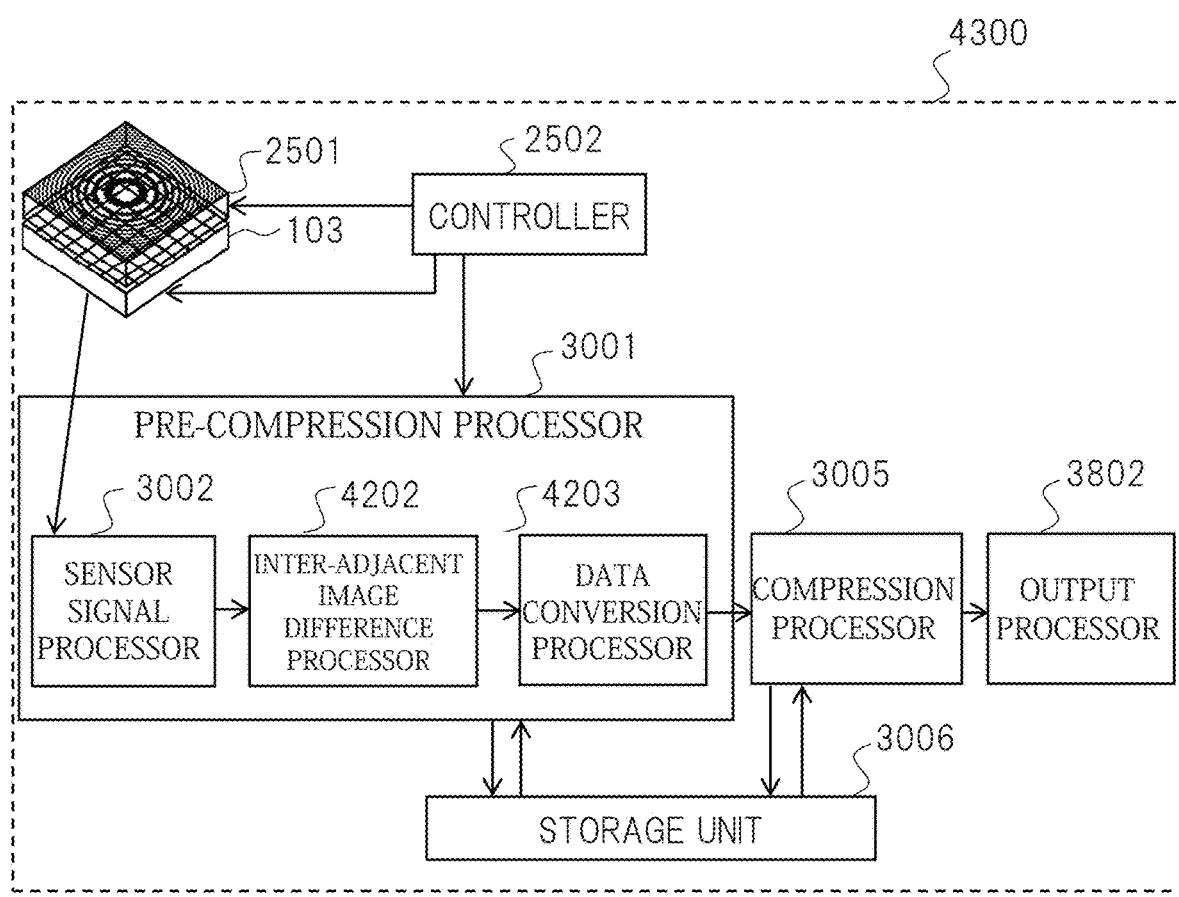
FIG. 43 is a view showing an example which compresses an image data capacity after a sensor signal processing.

FIG. 43 shows a configuration of an imaging apparatus according to another embodiment of the present invention. The same components as those in FIGS. 31 and 38 are denoted by the same reference numerals, and their descriptions will be omitted. An imaging apparatus 4300 of the present embodiment includes an image sensor 103, a modulator 2501, a controller 2502, a pre-compression processor 3001, a storage unit 3006, a compression processor 3005, and an output processor 3802.

The pre-compression processor 3001 includes a sensor signal processor 3002, an inter-adjacent pixel difference processor 4202, and a data conversion processor 4203. The inter-adjacent pixel difference processor 4202 receives an image signal from the sensor signal processor 3002, calculates a difference between adjacent pixels of an image based on the image signal, and specifies a range of the difference. The inter-adjacent pixel difference processor 4202 stores, for example, a head pixel value or an average value as an offset, and replaces the head pixel value with a difference pixel value between the head pixel value and its immediately preceding pixel value.

The data conversion processor 4203 generates compression image data based on a difference between the image signals and a difference between the pixels by the inter-adjacent pixel difference processor 4202. That is, the data conversion processor 4203 is a part that converts the difference pixel value into data suitable for compression.

Additionally, the compression processor 3005 compresses compression image data for generating the above compression image data. The output processor 3802 outputs the data compressed by the compression processor 3005.

The sensor image signal inputted to the pre-compression processor 3001 is processed by the sensor signal processor 3002, the inter-adjacent pixel difference processor 4202, and the data conversion processor 4203.

Figure 44:
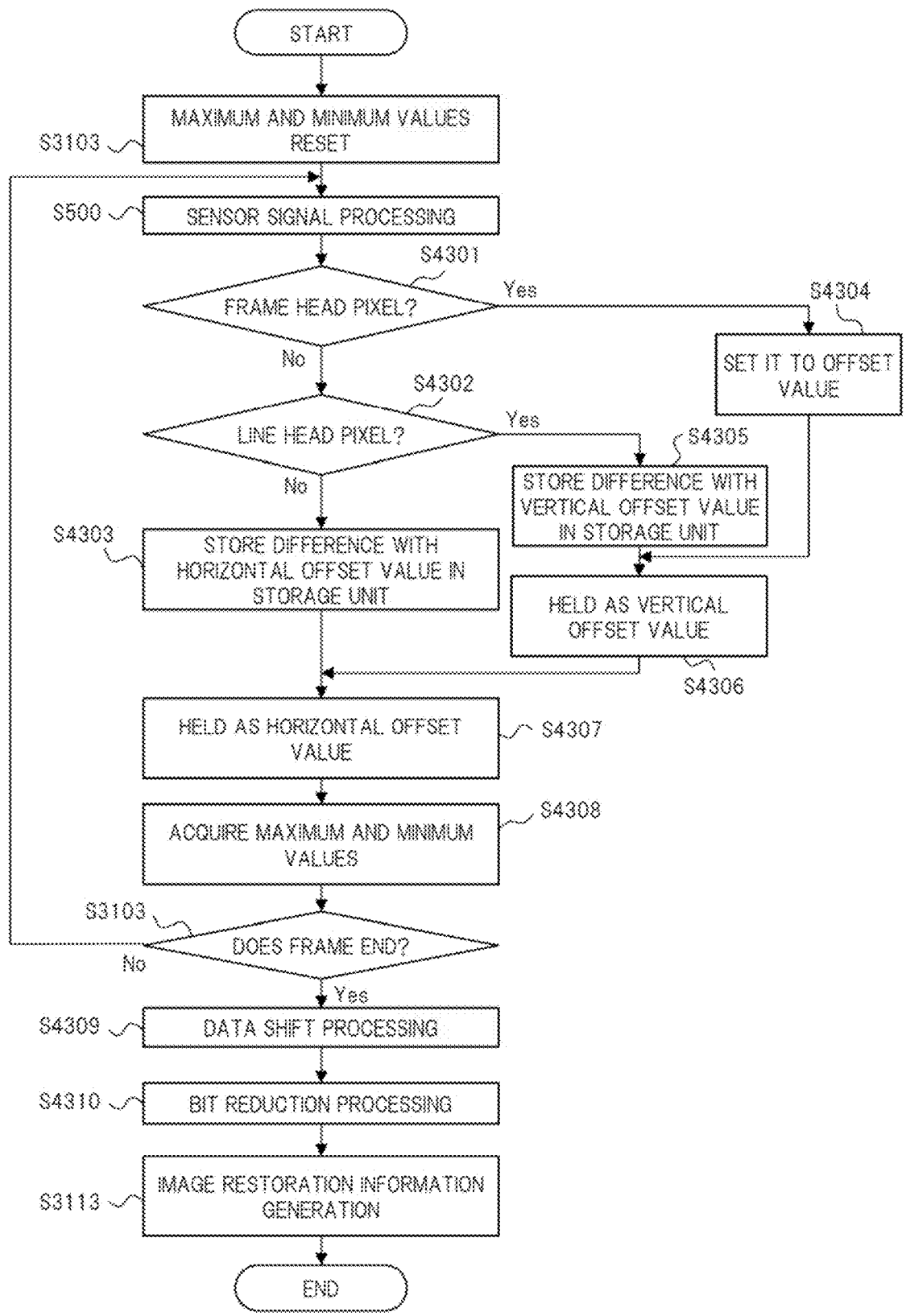
FIG. 44 is a diagram showing a processing flow of a pre-compression processor in the example which compresses the image data capacity after the sensor signal processing.

Processing procedures by the inter-adjacent pixel difference processor 4202 and the data conversion processor 4203 will be described with reference to a flowchart shown in FIG. 44. FIG. 44 is a flowchart showing the processing procedures performed by the inter-adjacent pixel difference processor 4202 and the data conversion processor 4203. Incidentally, the same components as those in FIG. 36 are denoted by the same reference numerals, and their descriptions will be omitted.

First, it is assumed that the inter-adjacent pixel difference processor 4202 is receiving an image signal from the sensor signal processor 3002. The inter-adjacent pixel difference processor 4202 determines whether the frame of the image signal after the sensor signal processing in step S500 is a head pixel or a pixel other than the head pixel (S4301). If it is the head pixel (S4301: Yes), a pixel value is set to an offset value of this frame in step S4304, is held as a vertical offset value in step S4306, and is held as a horizontal offset value in step S4307.

Incidentally, in a case where the image is a color image and one frame is composed of RGB etc., an offset may be set for each of RGB. If it is determined in step S4301 that the pixel is other than the head pixel (S4301: No), it is determined in step S4302 whether the pixel is a line head pixel (S4302). If the pixel is the line head pixel (S4302: Yes), a difference between the pixel value and the held vertical offset value is stored into the storage unit 3006 in step S4305 and is replaced with the vertical offset value that has held the pixel value in step S4306 and is then held.

If it is determined in step S4302 that the pixel is not the line head pixel (S4302: No), a difference between the pixel value and the horizontal offset value is stored, as a difference pixel value, in the storage unit 3006 in step S4303 and the pixel value is held as a horizontal offset value instead of the horizontal offset value held (stored) in step S4307. Next, in step S4308, the difference pixel value is compared with the minimum value and if the difference pixel value is smaller than the minimum value, the difference pixel value is set to the minimum value. Additionally, if the difference pixel value is larger than the maximum value, the difference pixel value is set to the maximum value. Next, it is determined in step S3103 whether the frame is ended. If it is determined that the frame is not ended (S3103: No), the processing returns to step S500 and a processing(s) for the next pixel is performed in the same manner.

In a case where the frame is ended (S3103: Yes), the data conversion processor 4203 performs a processing of subtracting the minimum value from the minimum value obtained in step S4308, for example, from all the difference pixel values, thereby performing a data shift processing of setting the minimum value of the difference pixel value to 0 in step S4309. In step S4310, the bit subtraction processing is performed to reduce, for example, unused higher-order bits from the maximum value obtained in step S4308.

Incidentally, as the bit reduction processing (S4310), in a case etc. where the number of bits of the image data is limited by an algorithm used for image compression, the data conversion processor 4203 performs a processing of re-allocating it to the number of bits to be a target.

The above-described pre-compression processing makes it possible to reduce the number of bits of the pixel value of the sensor image and to compress the image efficiently.

In the above-described first to third embodiments, the case where the pattern is switched by time division has been described. However, the pattern may be switched by space division. That is, as shown in FIG. 29, by using a modulator 2901 in which the first grating pattern, second grating pattern, third grating pattern, and fourth grating pattern are formed on the same surface, the image may be compressed. The image divider 2802 (division processing unit) shown in FIG. 29 divides the output of the image sensor 103 into regions according to the pattern arrangement of the modulator 2901 and transmits the divided regions to the pre-compression processor 3001.

Incidentally, the present invention is not limited to the above-described embodiment, and includes various modifications. For example, the above-described embodiments have been described in detail for easily understanding the present invention, and are not necessarily limited to those having all the configurations described above.

Additionally, a part of a configuration of one embodiment may be replaced with a configuration of another embodiment, and the configuration of one embodiment may be added to the configuration of another embodiment.

Also, for a part of the configuration of each embodiment, it is possible to add, delete, or replace another configuration.

Additionally, each of the above-described configurations, functions, processors, and processing means, etc. may be partially or entirely realized by hardware, for example, by using an integrated circuit to design it. Further, the above-described configurations and functions, etc. may be realized by software by a processor interpreting and executing a program of realizing each function. Information such as a program, a table, and a file for realizing each function can be stored in a recording apparatus such as a memory, a hard disk, a recording apparatus, or an SSD (Solid State Drive) or a recording medium such as an IC card, an SD card, or a DVD.

Additionally, the figures show control lines and information lines necessary for the descriptions, and do not necessarily show control lines and information lines on a product. In fact, it may be considered that almost all components are connected to each other.

INDUSTRIAL APPLICABILITY

The present invention is applicable to an apparatus which displays an image.

EXPLANATION OF REFERENCE NUMERALS

103 . . . Image sensor; 107 . . . Image display; 2203 . . . Focus setter; 2502 . . . Controller; 3000 . . . Imaging apparatus; 3001 . . . Pre-compression processor; 3002 . . . Sensor signal processor; 3003 . . . Difference processor; 3004 . . . Data Conversion processor; 3005 . . . Compression processor; 3006 . . . Storage unit; 3007 . . . Image output unit; 3008 . . . Storage apparatus; 3009 . . . Image input unit; 3010 . . . Decoding processor; 3011 . . . Development processor; 3012 . . . Storage unit; 3100 . . . Playback apparatus; 3801 . . . Imaging apparatus; 3802 . . . Output processor; 3803 . . . Network; 3804 . . . Input processor; 3805 . . . Image recorder; 4202 . . . Inter-adjacent pixel difference pixel; and 4203 . . . Data conversion processor.

The invention claimed is:

1. An imaging apparatus imaging an image, the imaging apparatus comprising:
    an image sensor configured to convert an optical image into image signals and output the converted image signals, the optical image being taken in a plurality of light receiving elements that are arranged on an imaging surface in an array;
    a modulator provided on a light receiving surface of the image sensor and configured to modulate an intensity of light;
    a signal processor configured to receive the image signals outputted from the image sensor:
    a difference processor configured to calculate a difference between the image signals received by the signal processor and to generate a first difference data based on the difference;
    a data converter configured to generate a first compression image data based on the first difference data and a range of values indicated by the difference between the image signals by the difference processor:
a compressor configured to compress the first compression image data generated by the data converter; and
an output unit configure to output the data compressed by the compressor, wherein
the modulator has a first grating pattern composed of a plurality of lines and a second grating pattern that has a phase shifted from the first grating pattern,
the signal processor receives a first image signal outputted by the first grating patter and a second image signal outputted by the second grating pattern,
the difference processor calculates a difference between the first image signal and the second image signal, and
the compressor contains information that indicates the range used by the data converter to generate the first compression image data.

2. The imaging apparatus according to claim 1, wherein
the second grating pattern is a grating pattern having a phase shifted by a from the first grating pattern,
the modulator further has a third grid pattern having a phase shifted by $\pi/2$ from the first grating pattern, and a fourth grid pattern having a phase shifted by $3\pi/2$ from the first grid pattern,
the signal processor receives a third image signal outputted by the third grid pattern, and a fourth image signal outputted by the fourth grating pattern,
the difference processor calculates a difference between the third image signal and the fourth image signal, and generates second difference data based on the difference,
the data converter generates a second compression image data based on the second difference data and a difference range of values indicated by the difference between the third image signal and the fourth image signal, and
the compressor contains information that indicates the difference range between the third image signal and the fourth image signal to the second compression image data, the compressor compressing the second compression image data and outputting it.

3. The imaging apparatus according to claim 1, further comprising:
the first grating pattern and the second grating pattern of the modulator being formed on the same plane;
a division processor configured to divide the image signal by a first image signal and a second image signal, the first image signal being in an area modulated by the first grating pattern, the second image signal being in an area modulated by the second grating pattern, wherein
the signal processor receives the first image signal and the second image signal based on a result divided by the division processor.

4. The imaging apparatus according to claim 2, further comprising:
the first, second, third, and fourth grating patterns of the modulator being formed on the same plane;
a division processor configure to divide the image signal into first, second, third, fourth image signals, the first image signal being in an area modulated by the first grating pattern, the second image signal being in an area modulated by the second grating pattern, the third image signal being in an area modulated by the third grating pattern, the fourth image signal being in an area modulated by the fourth grating pattern, wherein
signal processor receives the first, second, third, and fourth image signals based on a result divided by the division processor.

5. The imaging apparatus according to claim 1, wherein
the imaging apparatus is connected to a network, and
the output unit transmits and outputs the data compressed by the compressor via the network.

6. The imaging apparatus according to claim 1, wherein
the data convertor divides an image based on the image signal into a plurality of blocks, and specifies a difference range for each of the blocks.

7. The imaging apparatus according to claim 1, wherein
the grating pattern of the modulator is composed of a plurality of concentric circles, and
the plurality of concentric circles are arranged so that a pitch between the concentric circles is made finer in inverse proportion to a reference coordinate centered about the concentric circles.

8. The imaging apparats according to claim 1, wherein
the grating pattern of the modulator is composed of a plurality of straight lines, and
the plurality of straight lines are arranged so that a distance between the straight lines is narrowed in inverse proportion to the reference coordinate.

9. An imaging apparatus imaging an image, the imaging apparatus comprising:
an image sensor configured to convert an optical image into image signals and output the converted image signal, the optical image being taken in a plurality of light receiving elements that are arranged on an imaging surface in an array;
a modulator provided on a light receiving surface of the image sensor and configured to modulate an intensity of light:
a signal processor configured to receive the image signals outputted from the image sensor;
an inter-pixel difference processor configured to calculate a difference between adjacent pixels of an image based on the image signals received by the signal processor and specify a range of values indicated by the difference;
a data converter configured to generate compression image data based on the range of values indicated by the difference of the image signal by the inter-pixel difference processor and on the difference between the pixels;
a compressor configured to compress the compression image data generated by the data converter; and
an output unit configured to output the data compressed by the compressor, wherein
the modulator has a grating pattern composed of a plurality of lines, and
the signal processor receives an image signal outputted by the grating pattern.

10. An imaging system including an imaging apparatus and a restoring apparatus, the imaging apparatus compressing a result obtained by imaging an image, the restoring apparatus restoring the compressed result,
the imaging apparatus comprising:
an image sensor configured to convert an optical image into image signals, the optical image being taken in a plurality of light receiving elements that are arranged on an imaging surface in an array;
a modulator provided on a light receiving surface of the image sensor and configured to modulate an intensity of light;

a signal processor configured to receive the image signals outputted by the image sensor;

a difference processor configured to calculate a difference between the image signals received by the signal processor and generate a first difference data based on the difference;

a data converter configured to generate first compression image data based on the first difference data and a range of values indicated by the difference of the image signal by the difference processor;

a compressor configured to compress the first compression image data generated by the data convertor; and an output unit configured to output the data compressed by the compressor, the restoring apparatus comprising:

an input unit configured to input the data outputted by the output unit;

a decoding processor configured to decode the data inputted by the input unit and generate a compression restoration image;

an image restoration processor configured to generate a restoration difference image from the compression restoration data and the range of values indicated by the difference;

a modulation processor configured to modulate the restoration difference image and generate a moire-fringe image; and a signal processor configured to Fourier-transform the moire-fringe image and calculate a frequency spectrum, wherein the modulator has a first grating pattern composed of a plurality of lines, and a second grating pattern having a phase shifted from the first grating pattern, the signal processor receives a first image signal outputted by the first grating pattern, and a second image signal outputted by the second grating pattern, the difference processor calculates a difference between the first image signal and the second image signal, and the compressor contains information that indicates the range used by the data converter to generate the first compression image data.

* * * * *